US012669230B2

(12) United States Patent
Lim et al.

(10) Patent No.: US 12,669,230 B2
(45) Date of Patent: Jun. 30, 2026

(54) LIGHTING DEVICE

(71) Applicant: LG INNOTEK CO., LTD., Seoul (KR)

(72) Inventors: Eay Jin Lim, Seoul (KR); Kwang Hyun Ko, Seoul (KR); Hyun Duck Yang, Seoul (KR); Dong Hyun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 19/286,491

(22) Filed: Jul. 31, 2025

(65) Prior Publication Data

US 2025/0354671 A1     Nov. 20, 2025

Related U.S. Application Data

(63) Continuation of application No. 18/850,257, filed as application No. PCT/KR2023/004536 on Apr. 4, 2023, now Pat. No. 12,398,854.

(30) Foreign Application Priority Data

Apr. 4, 2022     (KR) ......................... 10-2022-0041879
Jun. 29, 2022     (KR) ......................... 10-2022-0079951

(51) Int. Cl.
*F21S 41/24*          (2018.01)
*F21S 41/141*          (2018.01)
(Continued)

(52) U.S. Cl.
CPC ............. *F21S 41/24* (2018.01); *F21S 41/141* (2018.01); *F21S 43/14* (2018.01); *F21S 43/241* (2018.01);
(Continued)

(58) Field of Classification Search
CPC ...................................................... F21S 41/24
See application file for complete search history.

(56) References Cited

U.S. PATENT DOCUMENTS 4,929,866 A     5/1990  Murata et al.
5,365,412 A     11/1994  Koppolu et al.
(Continued)

FOREIGN PATENT DOCUMENTS

JP          H01-251502          10/1989
JP          07-006610          1/1995
(Continued)

OTHER PUBLICATIONS

International Search Report dated Jun. 30, 2023 issued in Application No. PCT/KR2023/004536.
(Continued)

*Primary Examiner* — Eric T Eide
(74) *Attorney, Agent, or Firm* — KED & ASSOCIATES, LLP

(57)          ABSTRACT

A lighting device disclosed in an embodiment of the invention comprises a substrate; a light source disposed on the substrate; and a light guide member disposed on the substrate and the light source, wherein the light guide member includes an exit surface and a first reflective surface facing the exit surface, the first reflective surface includes a plurality of reflective portions having different heights with respect to an upper surface of the substrate, and each of the plurality of reflective portions may include a plurality of first surfaces inclined with respect to the upper surface of the substrate.

19 Claims, 19 Drawing Sheets

(51) Int. Cl.

| | |
|---|---|
| *F21S 43/14* | (2018.01) |
| *F21S 43/241* | (2018.01) |
| *F21S 43/245* | (2018.01) |
| *F21V 8/00* | (2006.01) |
| *F21Y 115/10* | (2016.01) |

(52) U.S. Cl.
CPC .......... *F21S 43/245* (2018.01); *G02B 6/0036* (2013.01); *F21Y 2115/10* (2016.08)

(56) References Cited

U.S. PATENT DOCUMENTS

| | | | |
|---|---|---|---|
| 6,036,340 | A | 3/2000 | Fohl et al. |
| 7,639,918 | B2 | 12/2009 | Sayers et al. |
| 9,494,291 | B2 | 11/2016 | Sagna et al. |
| 11,204,150 | B1 | 12/2021 | Han |
| 2003/0214815 | A1* | 11/2003 | Ishida ................... F21S 41/151 |
| | | | 362/516 |
| 2003/0235046 | A1 | 12/2003 | Chinniah et al. |
| 2006/0203486 | A1* | 9/2006 | Lee .................... G02B 27/0905 |
| | | | 362/244 |

| | | | |
|---|---|---|---|
| 2007/0195540 | A1 | 8/2007 | Misawa et al. |
| 2017/0122519 | A1 | 5/2017 | Freiding et al. |
| 2018/0224083 | A1 | 8/2018 | Nakayama |

FOREIGN PATENT DOCUMENTS

| | | |
|---|---|---|
| JP | 2005-327649 | 11/2005 |
| JP | 2007-227356 | 9/2007 |
| JP | 2010-129311 | 6/2010 |
| JP | 2015-533713 | 11/2015 |
| KR | 10-2008-0018329 | 2/2008 |
| KR | 10-2014-0083807 | 7/2014 |
| KR | 10-2018-0024588 | 3/2018 |
| KR | 10-2018-0076708 | 7/2018 |
| KR | 10-2019-0081790 | 7/2019 |
| KR | 10-2022-0026919 | 3/2022 |

OTHER PUBLICATIONS

U.S. Notice of Allowance dated May 7, 2025 issued in U.S. Appl. No. 18/850,257.

Japanese Office Action dated Sep. 9, 2025 issued in Application No. 2024-558411.

\* cited by examiner

【FIG. 1】
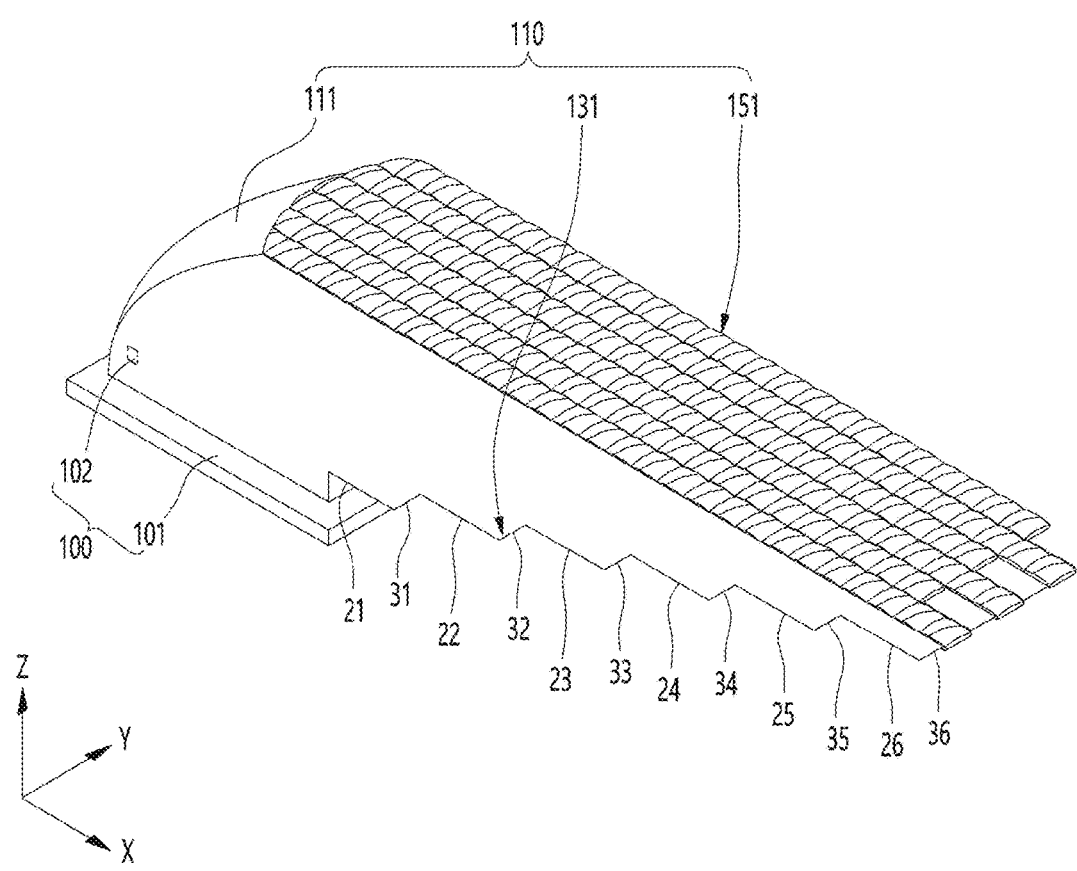

【FIG. 2】
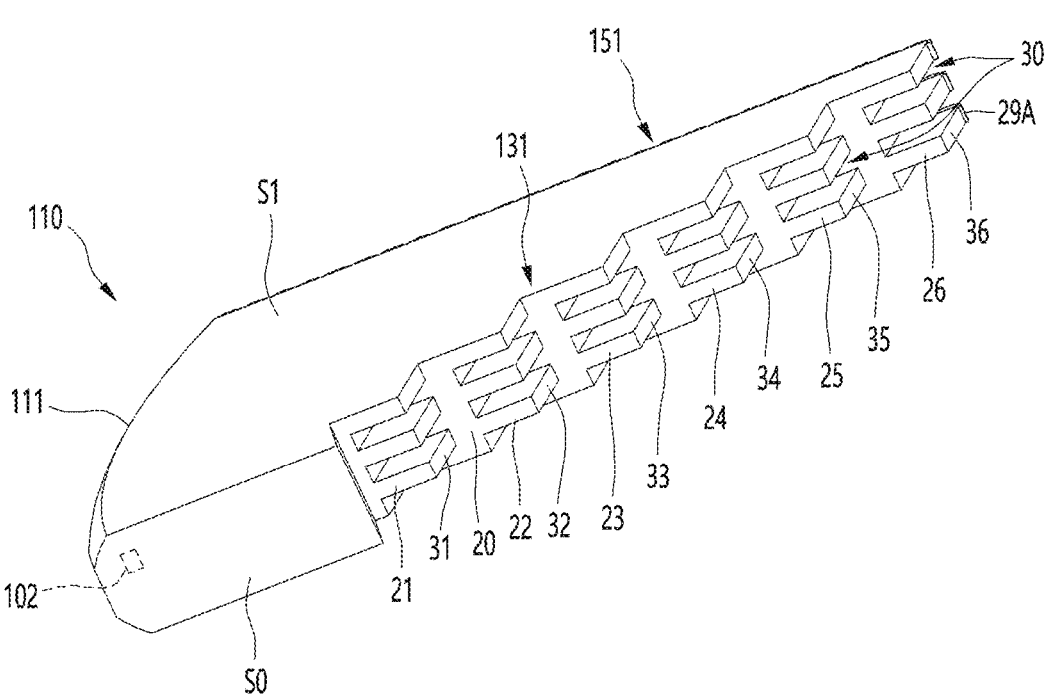

[FIG. 3]
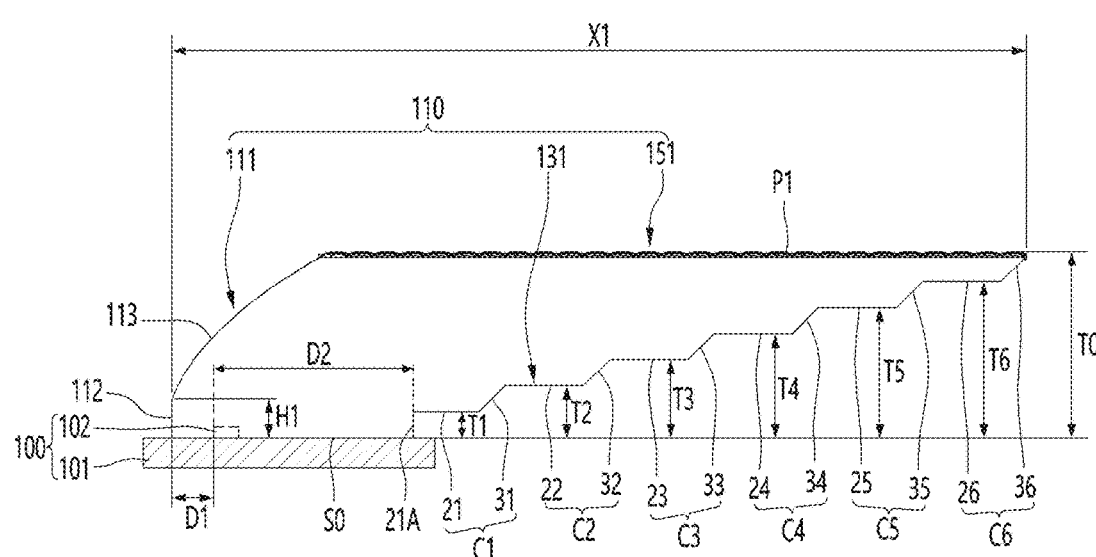
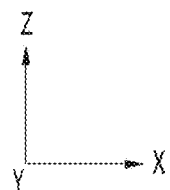

【FIG. 4】
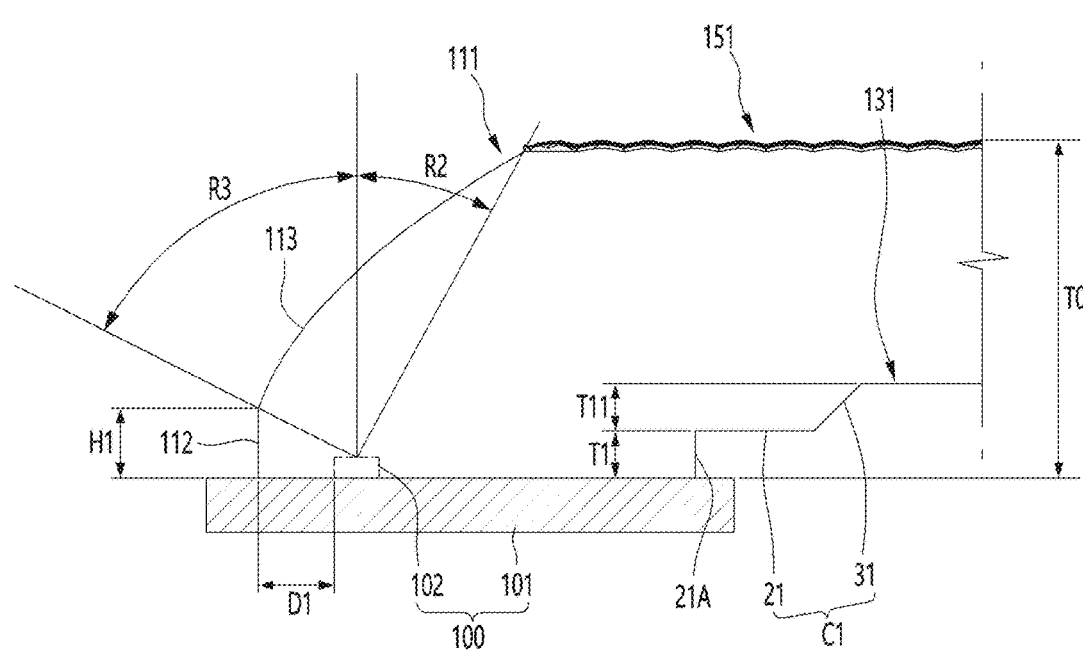

[FIG. 5]
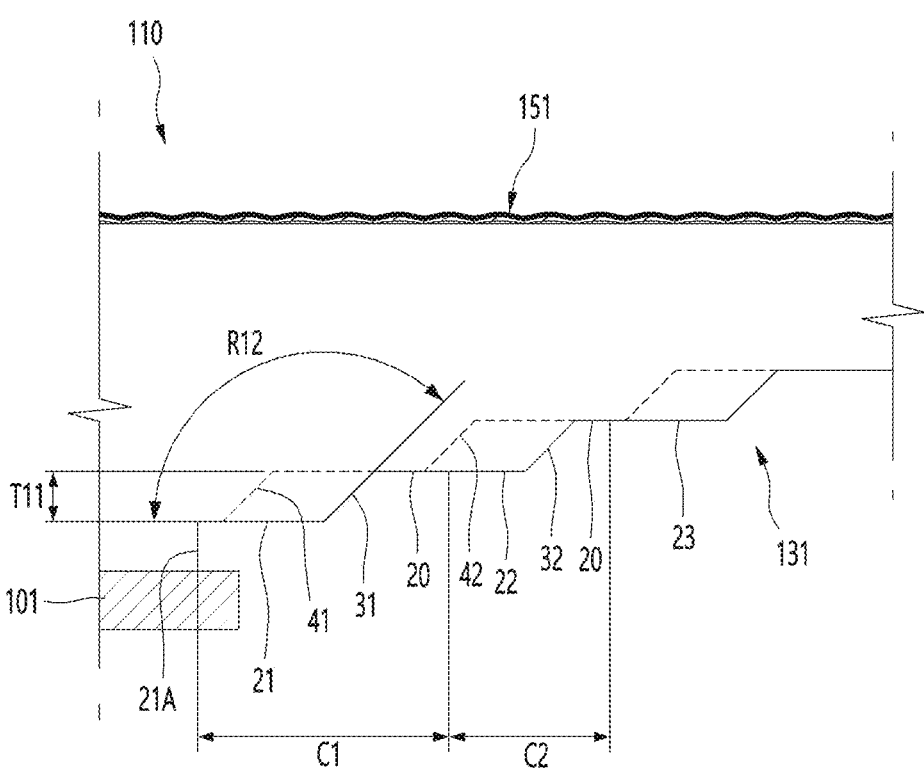

【FIG. 6】
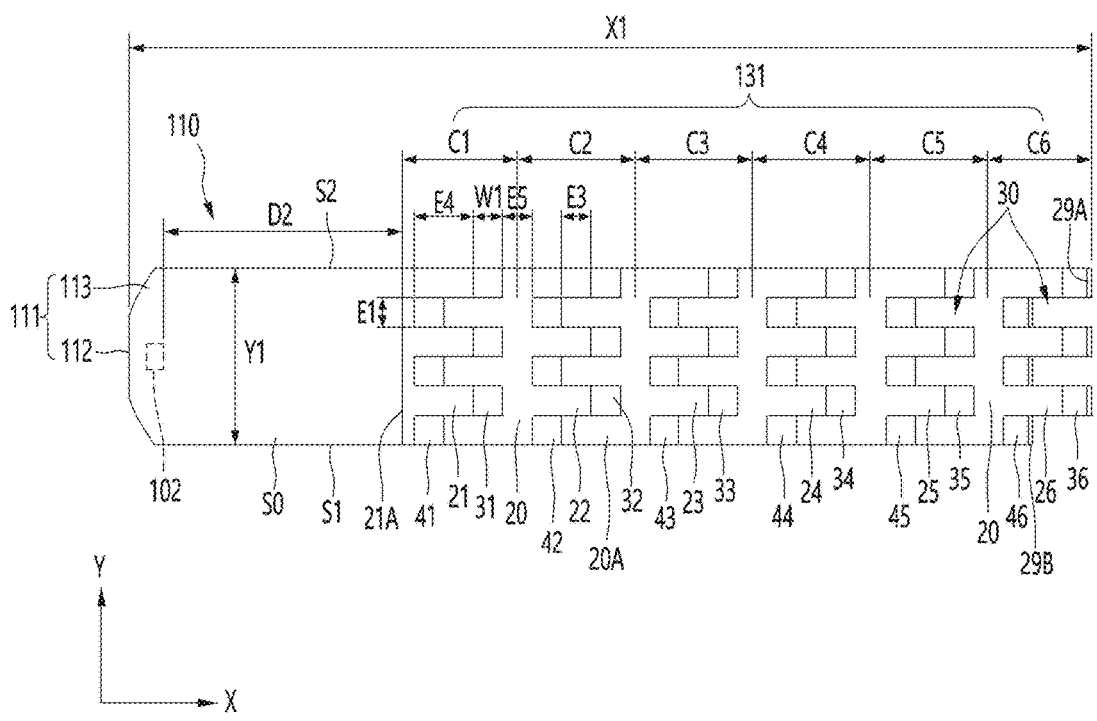
【FIG. 7】
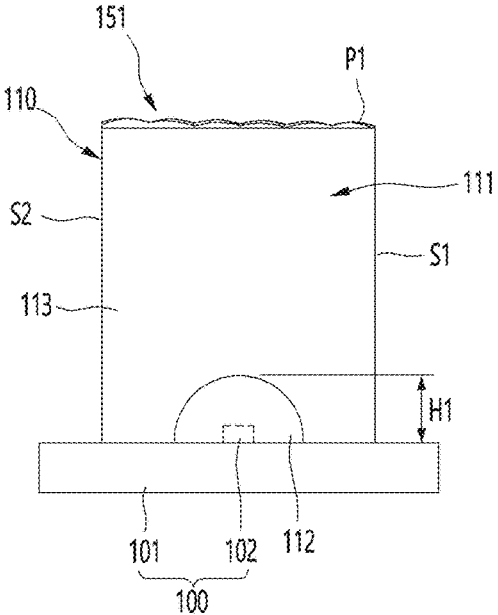

[FIG. 8]
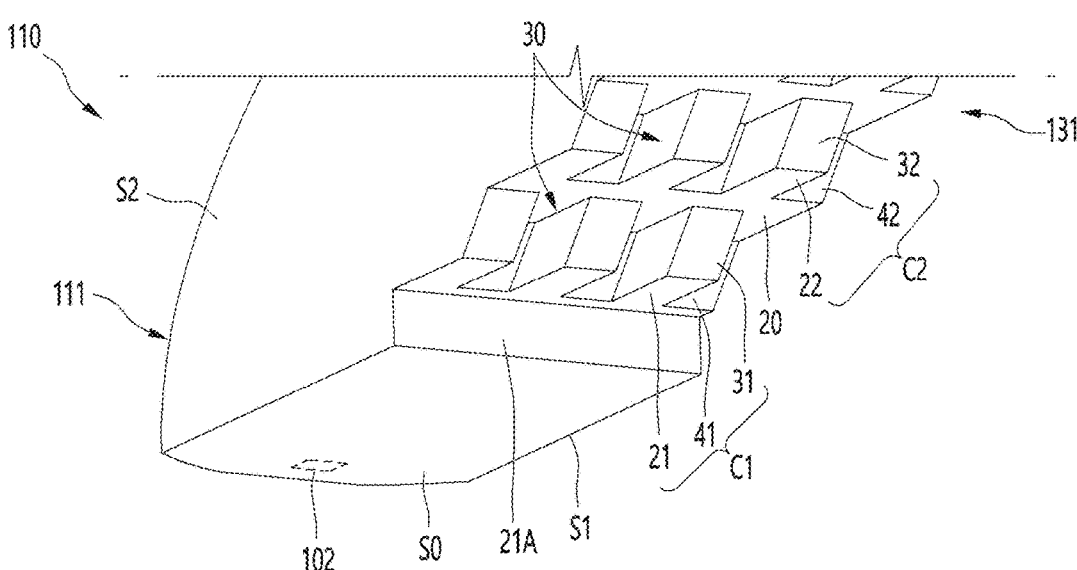

【FIG. 9】
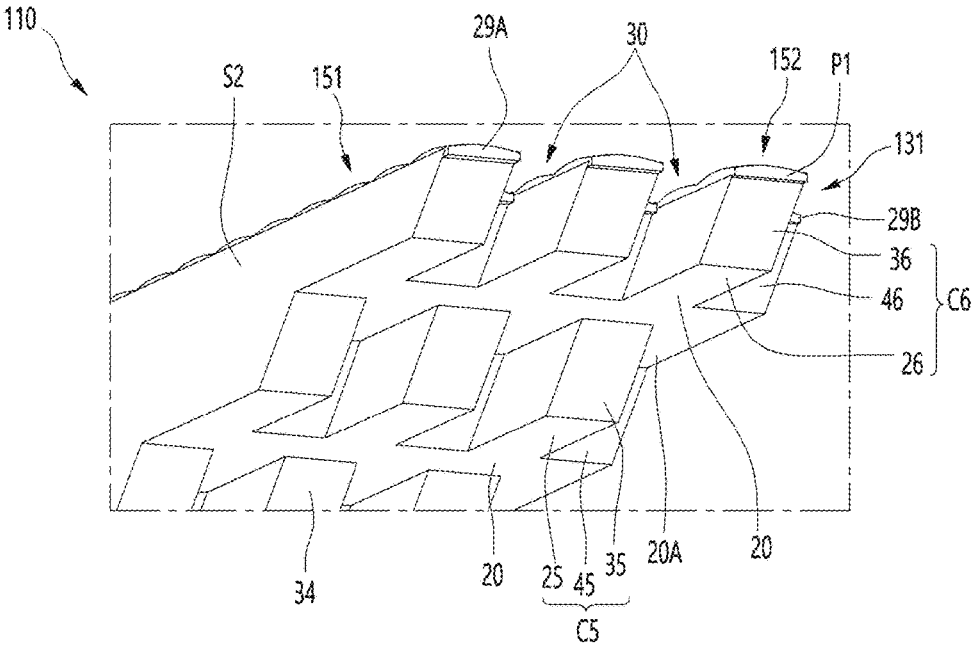
【FIG. 10】
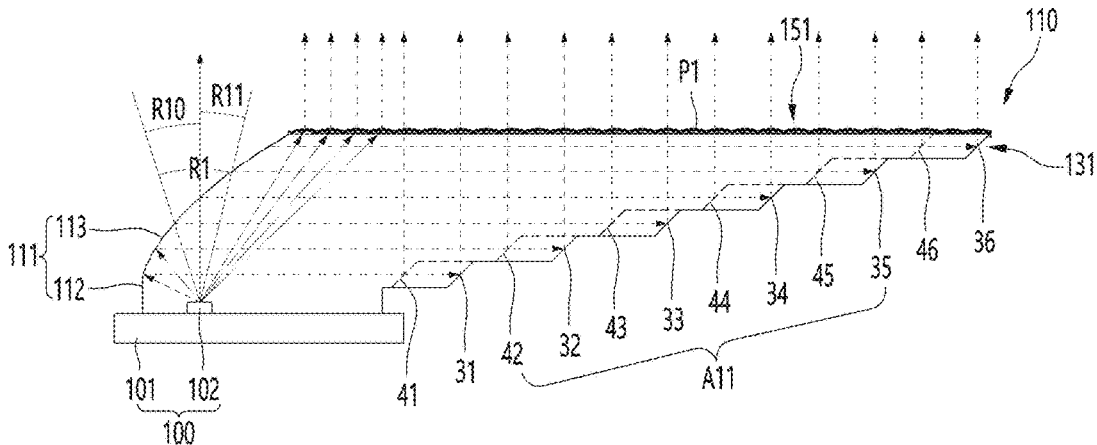

【FIG. 11】
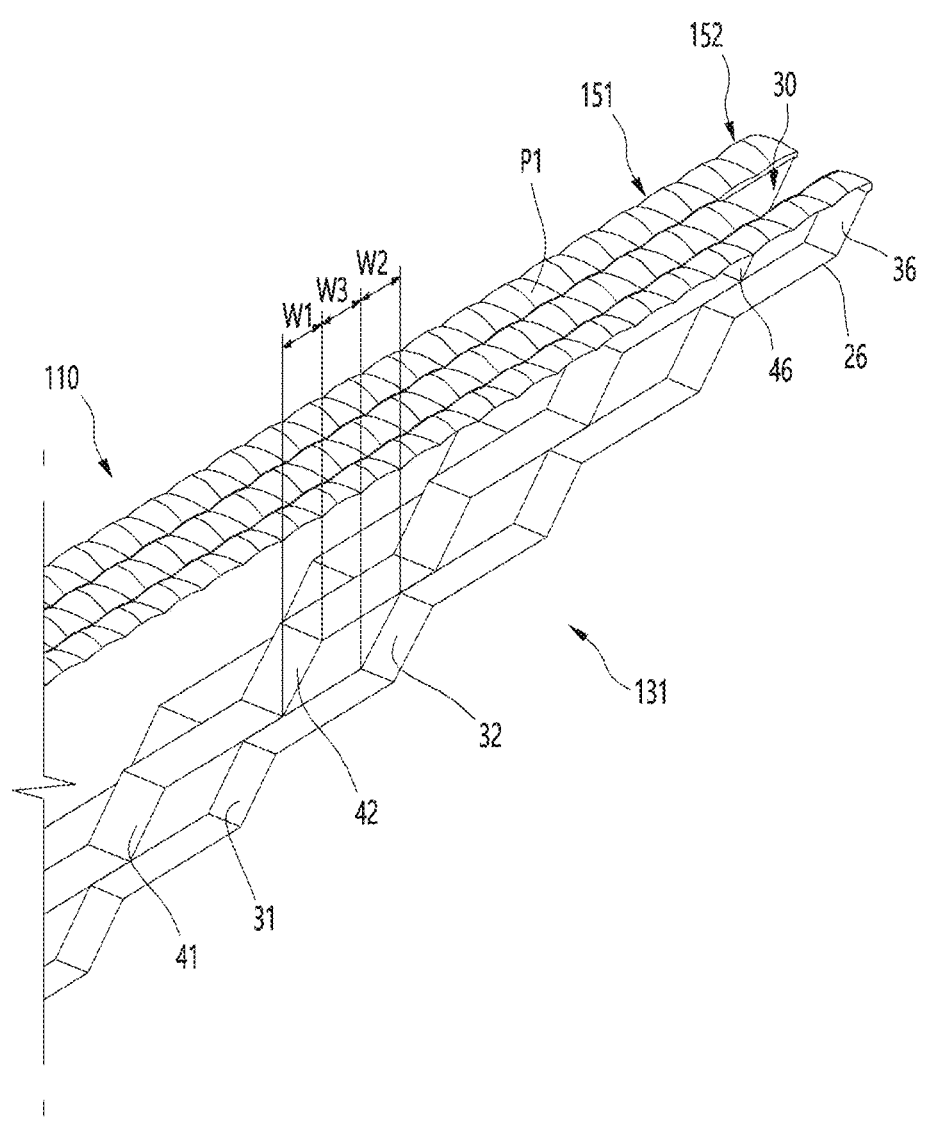

[FIG. 12]
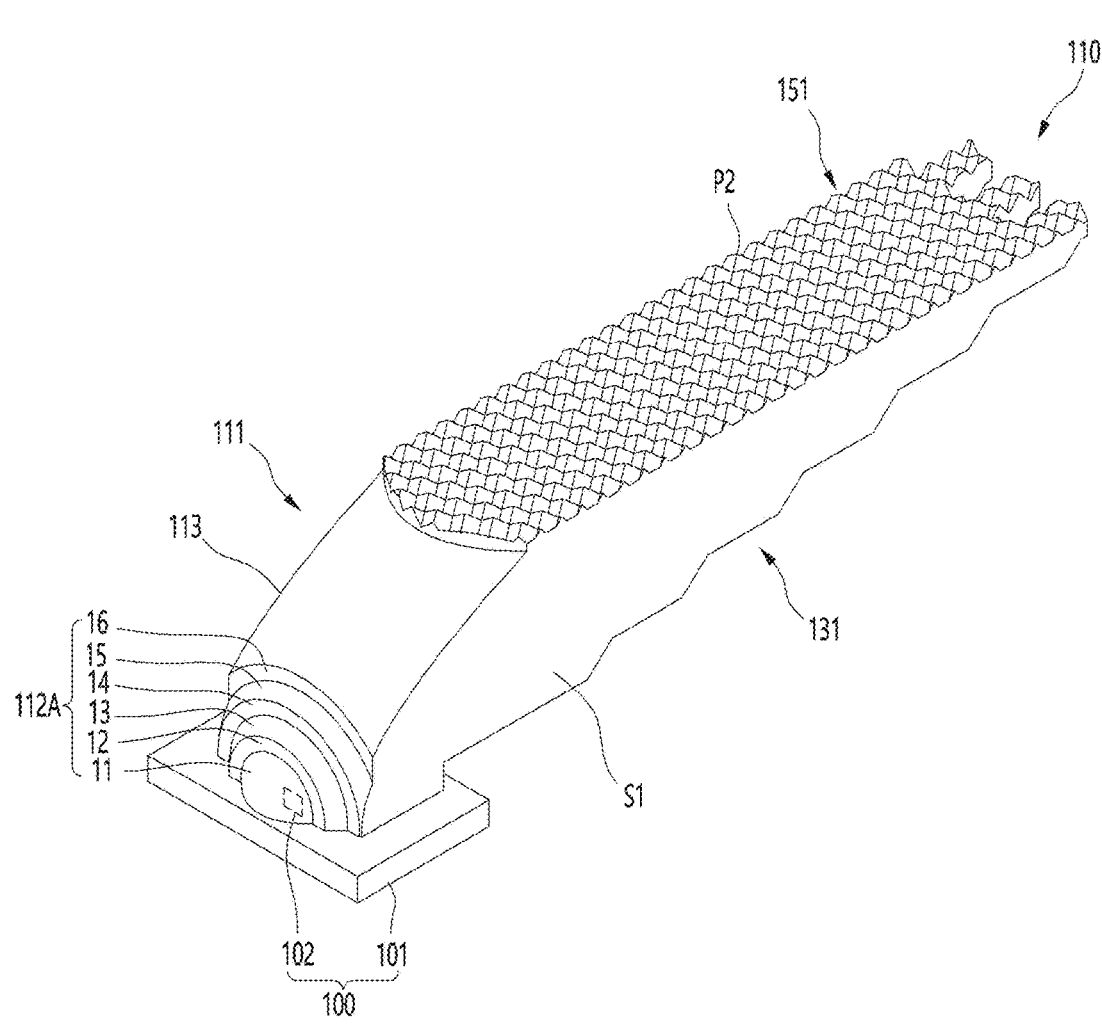

【FIG. 13】
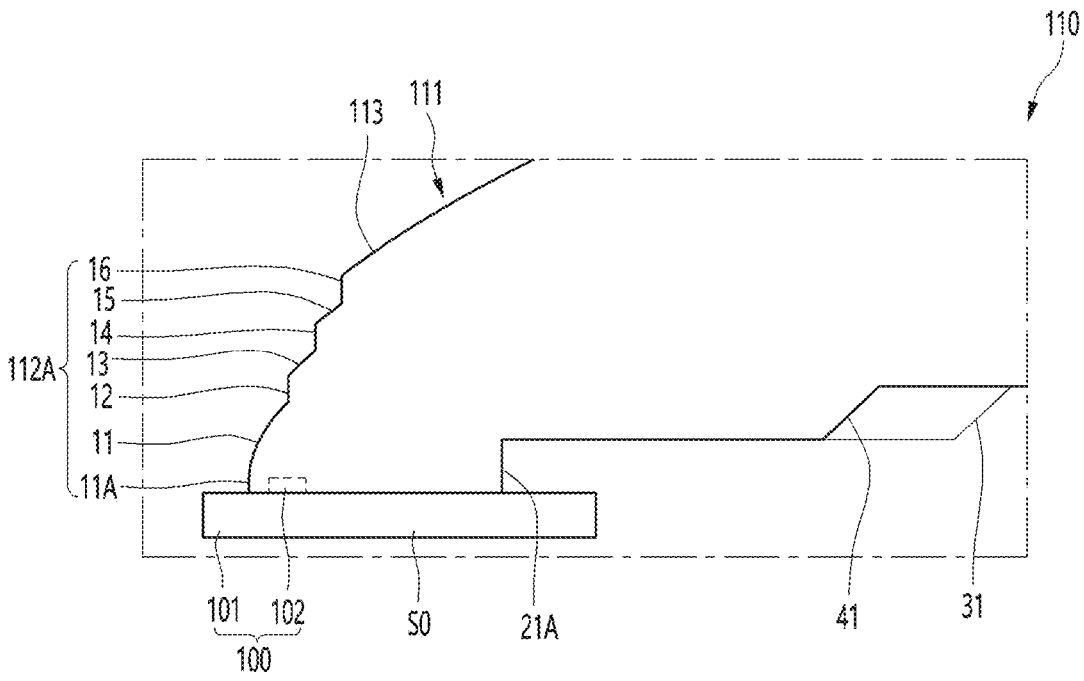
【FIG. 14】
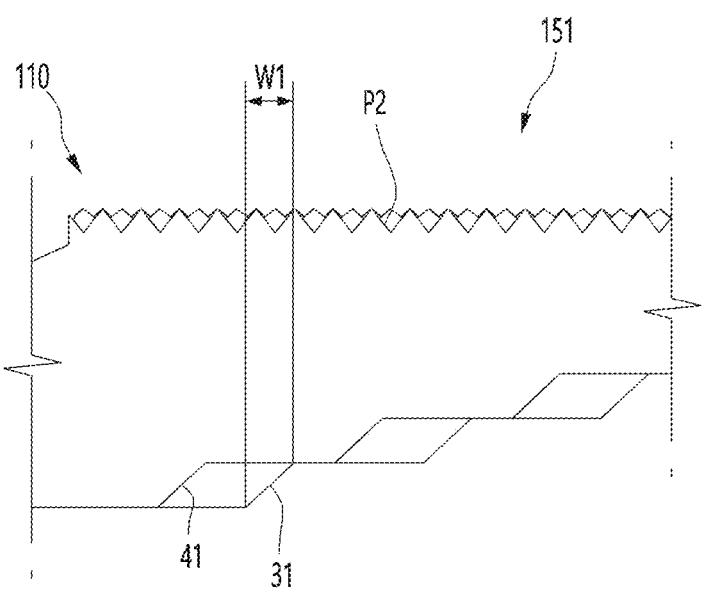

【FIG. 15】
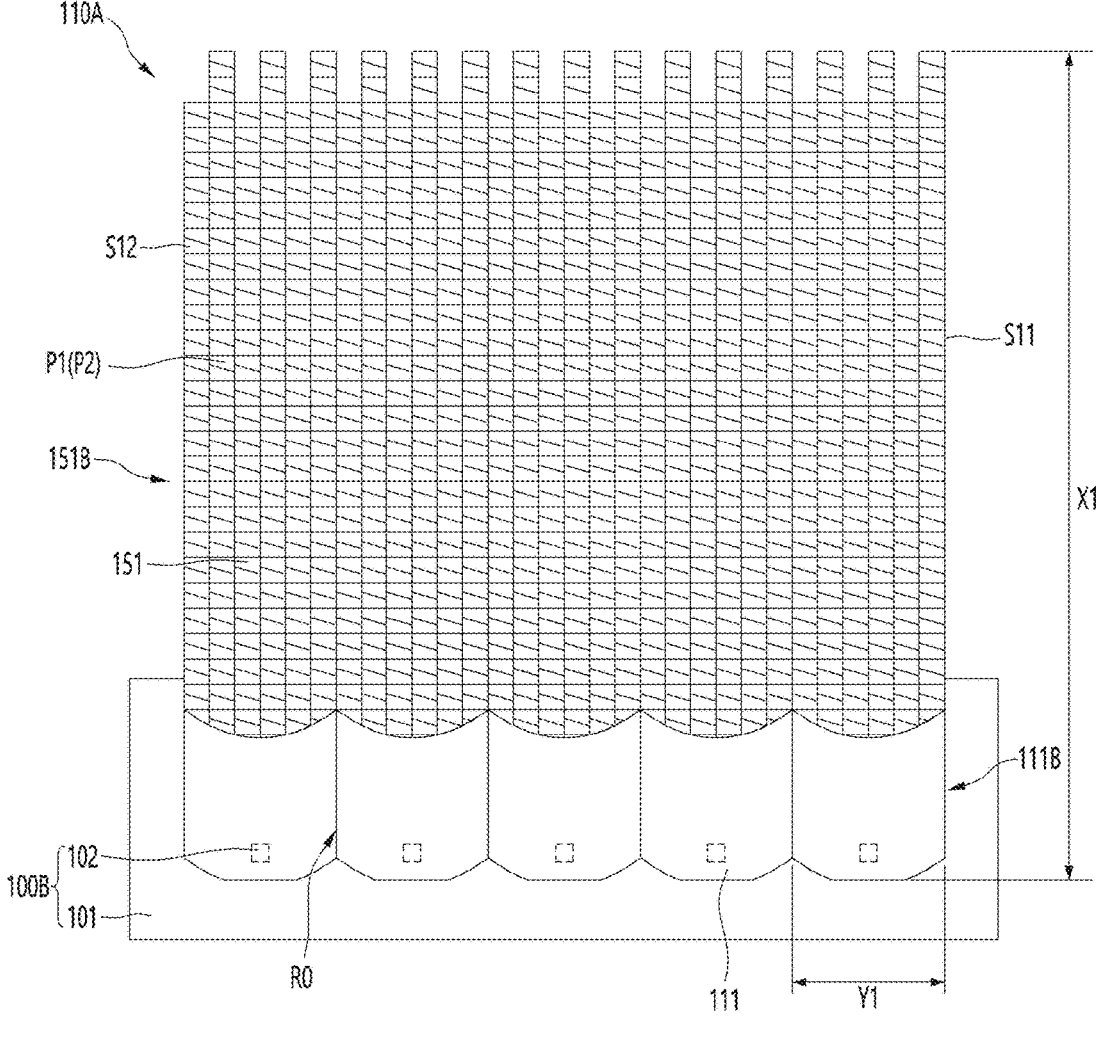

【FIG. 16】
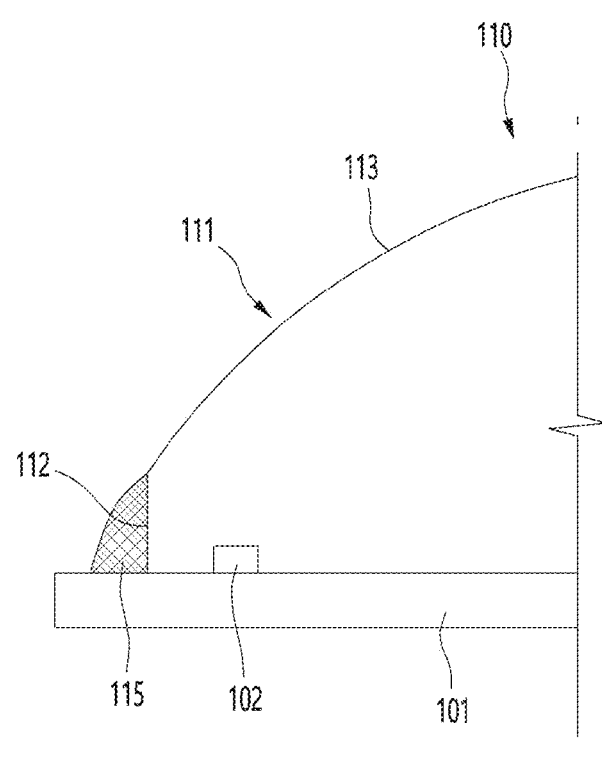

【FIG. 17】
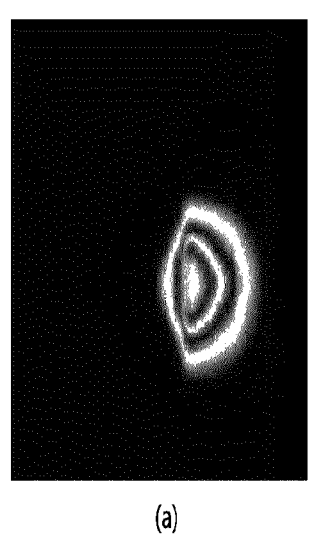
(a)
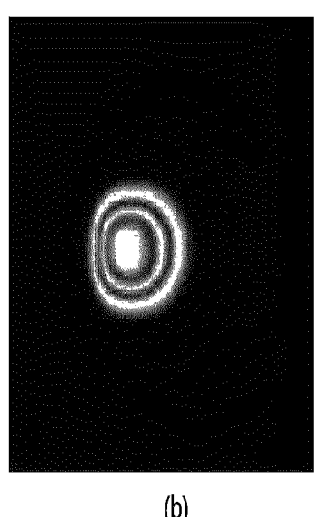
(b)
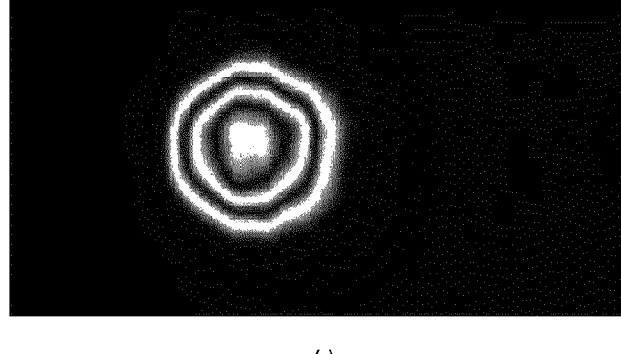
(c)
【FIG. 18】
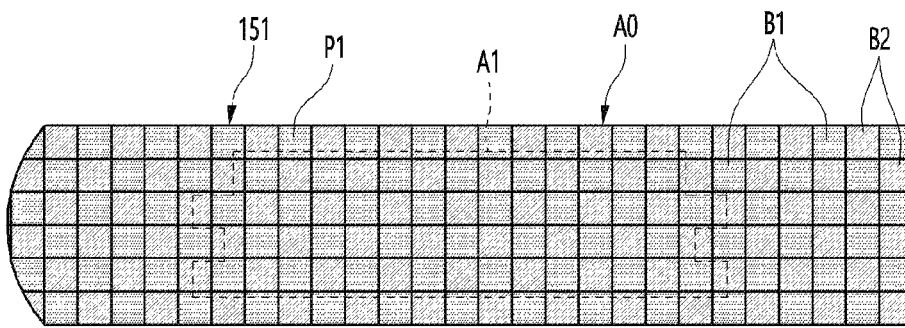

【FIG. 19】
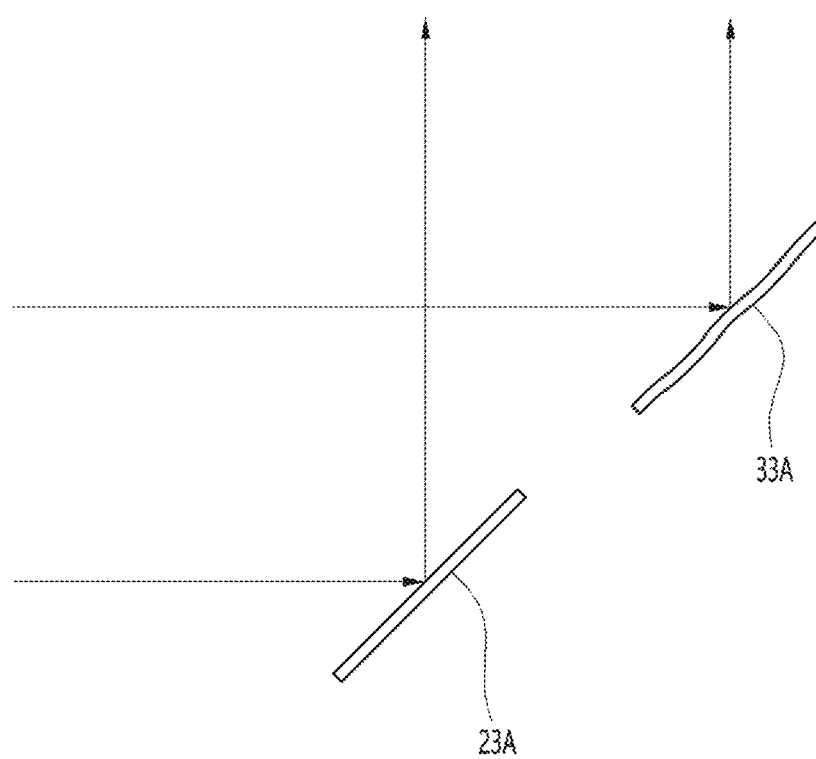

【FIG. 20】
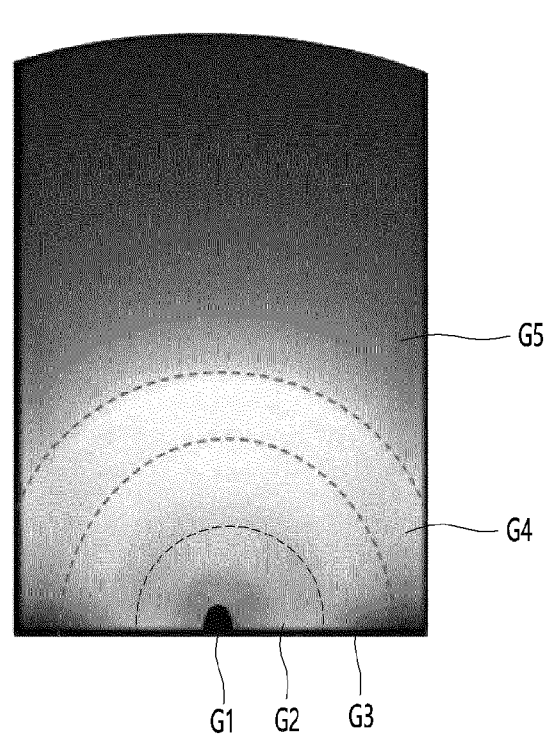

【FIG. 21】
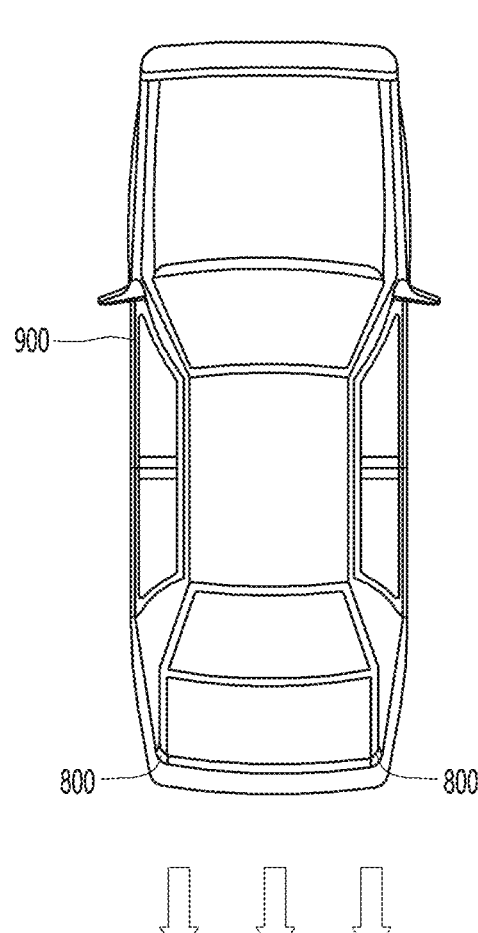

【FIG. 22】
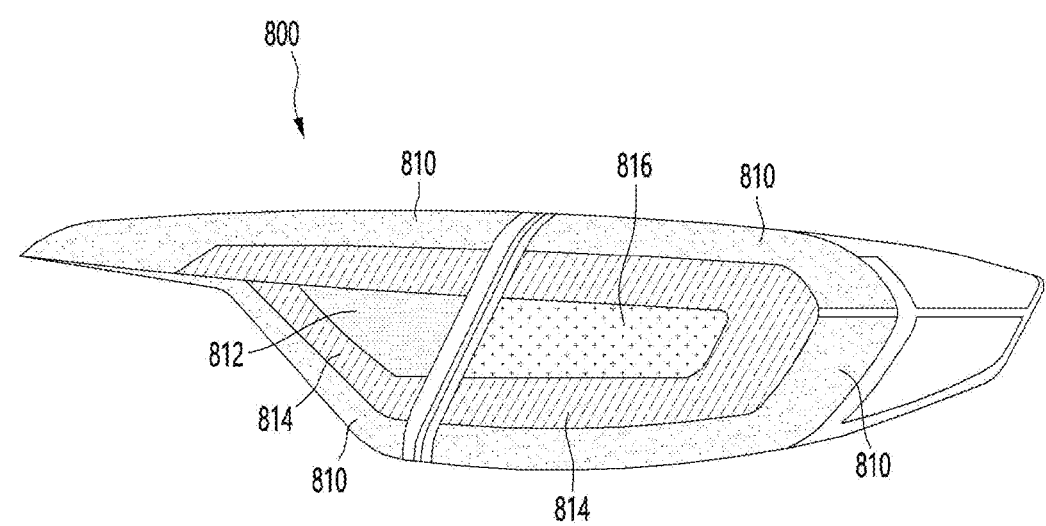

[FIG. 23]
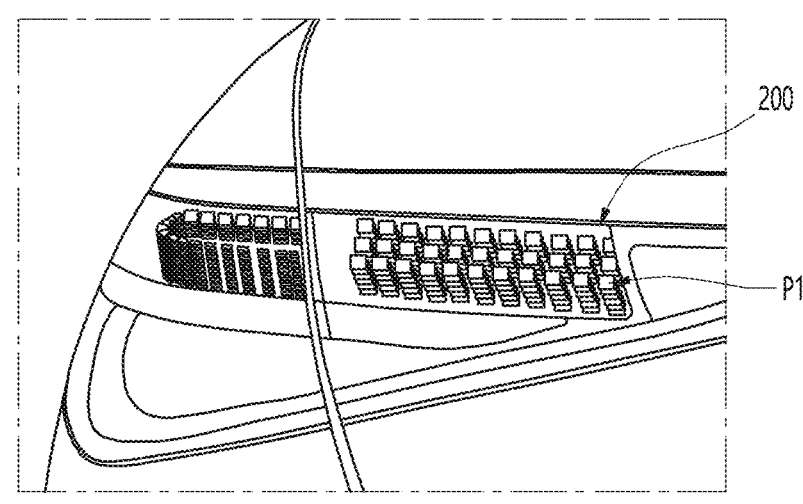

LIGHTING DEVICE

CROSS-REFERENCE TO RELATED PATENT APPLICATIONS

This application is a continuation of U.S. patent application Ser. No. 18/850,257, filed Sep. 24, 2024, which is a U.S. National Stage Application under 35 U.S.C. § 371 of PCT Application No. PCT/KR2023/004536, filed Apr. 4, 2023, which claims priority to Korean Patent Application Nos. 10-2022-0041879, filed Apr. 4, 2022 and 10-2022-0079951, filed Jun. 29, 2022, whose entire disclosures are hereby incorporated by reference.

TECHNICAL FIELD

An embodiment relates to a lighting device having a light source. The embodiment relates to a lighting device emitting light in a pattern shape or a matrix shape of a reflective surface. The embodiment relates to a vehicle lamp having the lighting device.

BACKGROUND ART

Lighting applications include vehicle lights as well as backlights for displays and signs. Light emitting device, such as light emitting diode (LED), have advantages such as low power consumption, semi-permanent life, fast response speed, safety, and environmental friendliness compared to conventional light sources such as fluorescent lamps and incandescent lamps. These light emitting diodes are applied to various display devices, various lighting devices such as indoor or outdoor lights. Recently, as a vehicle light source, a lamp employing a light emitting diode has been proposed. Compared with incandescent lamps, light emitting diodes are advantageous in that power consumption is small. However, since an emission angle of light emitted from the light emitting diode is small, when the light emitting diode is used as a vehicle lamp, there is a demand for increasing the light emitting area of the lamp using the light emitting diode. Light emitting diodes can increase the design freedom of lamps because of their small size, and they are also economical because of their semi-permanent lifespan.

DISCLOSURE

Technical Problem

An embodiment of the invention provides a lighting device having a dot-shaped pattern image. An embodiment of the invention provides a lighting device having an exit surface of a light guide member and a dot matrix-shaped reflective surface facing the exit surface. An embodiment of the invention provides a lighting device in which a vertical height between the reflective surfaces and the exit surface of the light guide member decreases as it gets farther away from a light source. An embodiment of the invention provides a lighting device having a light guide member having an exit surface and a reflective surface inclined along a stepped step. An embodiment of the invention provides a lighting device having a light source at a lower portion of one side of the light guide member, a primary reflective surface, a secondary reflective surface and an exit surface of the light guide member, and having a light shape of a dot-shaped pattern or a prism pattern through the exit surface. An embodiment of the invention can provide a lamp for a vehicle such as a moving object having the above-described lighting device.

Technical Solution

The lighting device according to an embodiment of an invention comprises a substrate; a light source disposed on the substrate; and a light guide member disposed on the substrate and the light source, wherein the light guide member comprises an exit surface and a first reflective surface facing the exit surface, wherein the first reflective surface comprises a plurality of reflective portions having different heights with respect to an upper surface of the substrate, and each of the plurality of reflective portions may comprise a plurality of first surfaces inclined with respect to the upper surface of the substrate.

According to the embodiment of the invention, the plurality of reflective portions may comprise a first reflective portion having a first height with respect to the upper surface of the substrate and a second reflective portion having a second height greater than the first height, and the first reflective portion may be disposed closer to the light source than the second reflective portion. The first surfaces may be inclined at a first angle of 120 degrees or more with respect to a straight line horizontal to the upper surface of the substrate. The first angle may be in a range of 120 degrees to 150 degrees or in a range of 128 degrees to 140 degrees.

According to an embodiment of the invention, each of the plurality of reflective portions is disposed between the plurality of first surfaces and includes a plurality of inclined second surfaces, and the plurality of second surfaces may be disposed closer to the light source than the first surface. The second surfaces may have an inclination angle equal to an inclination angle of the first surface with respect to the straight line horizontal to the upper surface of the substrate. The heights of the first surface and the second surface may be equal to each other. According to an embodiment of the invention, the plurality of reflective portions may have a higher height as the reflective portion is further from the light source.

According to an embodiment of the invention, a light guide distance of light horizontally incident from the light source to the second reflective portion through another reflective surface may be greater than a light guide distance of light horizontally incident from the light source to the first reflective portion through another reflective surface, and a light guide distance of light traveling vertically from the first reflective portion to the exit surface may be greater than a light guide distance of light traveling vertically from the second reflective portion to the exit surface.

A lighting device according to an embodiment of the invention comprises a substrate; a light source disposed on the substrate; and a light guide member disposed on the substrate and the light source, wherein the light guide member comprises an exit surface and a first reflective surface facing the exit surface, the exit surface comprises a plurality of patterns, and the first reflective surface comprises a plurality of first surfaces having different heights with respect to an upper surface of the substrate, and a number of the plurality of patterns may be different from a number of the plurality of first surfaces.

According to an embodiment of the invention, the number of the plurality of patterns may be greater than the number of the plurality of first surfaces. The plurality of patterns may be connected to each other in first and second directions that are orthogonal to each other.

According to an embodiment of the invention, the light guide member comprises a second reflective surface disposed on an upper end of the light source, an upper end of the second reflective surface may be connected to one end of the exit surface, and one end of the first reflective surface may be connected to the other end of the exit surface. The second reflective surface overlaps the substrate in a vertical direction, and the second reflective surface includes a lower reflective portion and a convex curved reflective portion on the lower reflective portion in a region adjacent to the light source, and a distance between one end of the first reflective surface and the light source may be greater than a minimum distance between the light source and the second reflective surface.

According to an embodiment of the invention, each of the plurality of first surfaces may be inclined, and a thickness of the light guide member may gradually become thinner as the first surface is further from the light source.

According to an embodiment of the invention, the substrate is disposed on a lower surface of the light guide member, the light source is embedded in an inner side of the lower surface of the light guide member, and the patterns of the exit surface of the light guide member may overlap with the lower surface of the light guide member in a vertical direction.

According to an embodiment of the invention, a portion of the first surface may be formed as an uneven pattern. The first surface having the uneven pattern may face a center portion of the upper and lower surfaces of the second reflective surface. A pattern of the exit surface corresponding to the first reflective surface may include a pattern that overlaps in a vertical direction with the first surface and a pattern that overlaps in a vertical direction with a bottom of the first reflective surface.

A vehicle lamp according to an embodiment of the invention includes the lighting device disclosed above, wherein the lighting device emits a dot matrix-shaped pattern through the exit surface.

Advantageous Effects

According to the lighting device according to the embodiment of the invention, a pattern image in the form of a dot matrix can be provided, various light distribution images can be provided, and the light uniformity of the pattern image can be improved. In addition, the light distribution of the lighting device can be improved and the lighting image can be provided in various forms.

According to an embodiment of the invention, since the light guide member has a reflective surface by which light from different reflective surfaces is corroded to adjust the reflection luminous intensity, uniformity of light on the exit side may be improved.

The optical reliability of the lighting device according to the embodiment of the invention and the vehicle lamp having the same can be improved. The embodiment of the invention can be applied to a light unit having the lighting device, or an external or internal lighting lamp.

DESCRIPTION OF DRAWINGS

FIG. 1 is a perspective view of a lighting device according to an embodiment.

FIG. 2 is a perspective view showing a first reflective surface of a light guide member in the lighting device of FIG. 1.

FIG. 3 is a side cross-sectional view of the lighting device of FIG. 1.

FIG. 4 is a drawing for explaining the first and second reflective surfaces in the lighting device of FIG. 3.

FIG. 5 is a drawing for explaining the inclination angle of the first reflective surface of the lighting device of FIG. 3.

FIG. 6 is a rear view of the light guide member of the lighting device of FIG. 1.

FIG. 7 is a side view showing the second reflective surface of the lighting device of FIG. 1.

FIG. 8 is a drawing for explaining the lower portion of the first reflective surface of the lighting device of FIG. 2.

FIG. 9 is a drawing for explaining the upper portion of the first reflective surface of the lighting device of FIG. 2.

FIG. 10 is a drawing for explaining the path of light in the lighting device of FIG. 3.

FIG. 11 is a perspective view for explaining the first reflective surface in the light guide member of FIG. 2.

FIG. 12 is another example of the lighting device of FIG. 1.

FIG. 13 is a partial side cross-sectional view of the lighting device of FIG. 12.

FIG. 14 is a drawing for explaining the pattern of the exit surface and the reflective surface of the lighting device of FIG. 12.

FIG. 15 is another example of the lighting device of FIG. 1.

FIG. 16 is an example of arranging a reflection member on the second reflective surface of the lighting device according to an embodiment of the invention.

FIG. 17 (a) to (c) are drawings for explaining the distribution of light emitted through the pattern of the exit surface in the lighting device according to an embodiment of the invention.

FIG. 18 is a drawing for explaining the distribution shape of light emitted by the lighting device of FIG. 1.

FIG. 19 is a drawing for comparing a surface that has been corroded and a surface that has not been corroded in the first reflective surface in an embodiment of the invention.

FIG. 20 is a drawing illustrating a light distribution passing through a light guide member according to an embodiment of the invention.

FIG. 21 is a drawing illustrating a lighting device or a lamp having a lighting device according to an embodiment.

FIG. 22 is an example of a vehicle tail light of FIG. 21.

FIG. 23 is a drawing illustrating a pattern of a lighting device according to an embodiment of the invention applied to a vehicle lamp.

BEST MODE

Hereinafter, preferred embodiments of the invention will be described in detail with reference to the accompanying drawings.

The technical idea of the present invention is not limited to some of the described embodiments, but can be implemented in various different forms, and if it is within the scope of the technical idea of the present invention, one or more of its components may be selectively combined and substituted between embodiments. In addition, terms (including technical and scientific terms) used in the embodiments of the present invention, unless explicitly specifically defined and described, may be interpreted as a meaning that may be generally understood by those skilled in the art to which the present invention belongs, and terms generally used, such as terms defined in the dictionary, may be interpreted in consideration of the context of the related technology. Terms used in the embodiments of the present invention are for describing the embodiments and are not intended to limit the present invention. In the present specification, the singular form may include a plural form unless specifically described in the phrase, and may include at least one of all combinations that may be combined as A, B, and C when described as "A and/or at least one (or more than one) of B and C". Also, terms such as first, second, A, B, (a), and (b) may be used to describe components of an embodiment of the present invention. These terms are intended only to distinguish the components from other components and are not determined by their nature, sequence, or order. Also, when a component is described as being 'connected', 'coupled' or 'connected' to another component, not only when the component is directly connected, coupled or connected to another component, it may also be 'connected', 'coupled', or 'connected' due to another component between that component and the other component. In addition, when each component is described as being formed or disposed "up (above) or down (bottom)", the up (down) or down (bottom) includes not only when two components are in direct contact with each other, but also when one or more components are formed or disposed between two components. Also, when expressed as "up (above) or down (bottom)", it may include the meaning of not only the upward direction but also the downward direction based on one component.

The lighting device according to the embodiment can be applied to various lamp devices requiring lighting, such as vehicle lamps, household lighting devices, and industrial lighting devices. For example, when applied to vehicle lamps, it can be applied to head lamps, side mirror lights, side maker lights, fog lights, tail lamps, brake lights, daytime running lights, vehicle interior lights, door scars, rear combination lamps, backup lamps, and the like. The lighting device of the invention can be applied to indoor and outdoor advertising devices, display devices, and various types of electric vehicles, and can also be applied to all lighting-related fields or advertising-related fields that are currently developed and commercialized or can be implemented in the future with technological advancement.

<Lighting Device>

FIG. 1 is a perspective view of a lighting device according to an embodiment, FIG. 2 is a perspective view showing a first reflective surface of a light guide member in the lighting device of FIG. 1, FIG. 3 is a cross-sectional view taken along the line A-A of the lighting device of FIG. 1, FIG. 4 is a drawing for explaining the first and second reflective surfaces in the lighting device of FIG. 3, FIG. 5 is a drawing for explaining the first reflective surface of the lighting device of FIG. 3, FIG. 6 is a rear view of the light guide member of the lighting device of FIG. 1, FIG. 7 is a side view showing the second reflective surface of the lighting device of FIG. 1, FIG. 8 is a drawing for explaining the lower portion of the first reflective surface of the lighting device of FIG. 2, FIG. 9 is a drawing for explaining the upper portion of the first reflective surface of the lighting device of FIG. 2, FIG. 10 is a drawing for explaining the path of light in the lighting device of FIG. 3, FIG. 11 is a perspective view for explaining the first reflective surface in the light guide member of FIG. 2, FIG. 12 is another example of the lighting device of FIG. 1, FIG. 13 is a partial side cross-sectional view of the lighting device of FIG. 12, and FIG. 14 is a drawing for explaining the pattern of the exit surface and the reflective surface of the lighting device of FIG. 12.

Referring to FIGS. 1 to 13, a lighting device 200 according to the embodiment of the invention includes a light emitting portion 100 and a light guide member 110. The light emitting portion 100 includes a substrate 101 disposed under the light guide member 110 and a light source 102 disposed on the substrate 101.

The light emitting portion 100 is disposed under one side of the light guide member 110 and emits light from the lower side to the upper side of the light guide member 110. As another example, the light emitting portion 100 may emit light from one side to the other side of the light guide member 110.

The lighting device 200 can be defined as a light emitting cell for a structure having the light guide member 110, light source 102, and substrate 101. In the lighting device 200, the light emitting cells may be connected in a plurality as shown in FIG. 15, or arranged in a state where parts or all of the plurality of light emitting cells are separated from each other. In addition, the lighting device 200 may have one light emitting cell or a plurality of light emitting cells arranged on the substrate 101. The lighting device 200 can emit light in a reflective structure or matrix shape of a reflective surface 131. The lighting device can provide a lamp having various lighting shapes.

<Substrate 101>

The substrate 101 may include a printed circuit board (PCB). The substrate 101 may include, for example, at least one of a resin-based PCB, a metal core PCB, a flexible PCB, a ceramic PCB, or an FR-4 substrate. When the substrate 101 is disposed as a metal core PCB having a metal layer disposed on the bottom, the heat dissipation efficiency of the light source 102 may be improved.

The substrate 101 may be electrically connected to the light source 102. The substrate 101 may include a wiring layer (not shown) on the upper side, and the wiring layer may be electrically connected to the light source 102. When a plurality of light sources 102 is arranged on the substrate 101, the plurality of light sources 102 may be connected in series, in parallel, or in series-parallel by the wiring layer. The substrate 101 may function as a base member or a support member disposed under the light source 102 and the light guide member 110.

The upper surface of the substrate 101 may have an X-Y plane. The upper surface of the substrate 101 may be a flat plane or a curved surface. The thickness of the substrate 101 may be a height in a vertical direction or a Z direction. Here, the X direction may be a first direction, and the Y direction may be a second direction. The Z direction may be a direction orthogonal to the first and second directions. The light source 102 may be disposed singly on the substrate 101, and when arranged in plurality, they may be arranged in the second direction Y.

The substrate 101 may be made of a flexible material, and the flexible substrate may be closely attached to the housing of a lamp in a vehicle. The substrate 101 may include a light-transmitting material through which light is transmitted through the upper and lower surfaces. The light-transmitting material may include at least one of PET (Polyethylene terephthalate), PS (Polystyrene), and PI (Polyimide). A reflective layer (not shown) may be disposed on the substrate 101. The reflective layer is disposed between the substrate 101 and the light guide member 110 and may reflect incident light. The reflective layer may include a metallic material or a non-metallic material. The metallic material may include a metal such as aluminum, silver, or gold. The non-metallic material may include a plastic material or a resin material.

<Light Source 102>

The light source 102 is disposed on the substrate 101 and emits light in a third direction Z from one side of the light guide member 110. The light source 102 emits light through a different side surface from the upper surface on one side of the light guide member 110.

The light source 102 may be disposed on the lower side of one side of the light guide member 110. The light source 102 may be disposed within one side of the light guide member 110. That is, the light guide member 110 may be disposed on the surface of the light source 102 or may seal the light source 102. The upper surface of the light source 102 may be positioned higher than the lower surface S0 of the light guide member 110, and a plurality of side surfaces may be in contact with the light guide member 110. The light source 102 emits light with the highest intensity in the third direction Z. The light source 102 may be electrically connected to the substrate 101 and may be provided as a package that covers the surface of the LED chip or the LED chip with resin. The light source 102 is a light emitting device having a light emitting diode (LED), and may include a package in which a light emitting chip is packaged. The light emitting chip may emit at least one of blue, red, green, ultraviolet (UV), and infrared, and the light source 102 may emit at least one of white, blue, red, green, and infrared.

<Light Guide Member 110>

The light guide member 110 may be disposed on the substrate 101. The lower surface S0 of the light guide member 110 may face the substrate 101. The light guide member 110 may be disposed on a portion of the substrate 101. An area of the lower surface S0 of the light guide member 110 facing the substrate 101 may be equal to or smaller than an area of the upper surface of the substrate 101. The substrate 110 may be disposed on one side of the lower portion of the light guide member 110.

The light guide member 110 may be formed of a transparent material. The light guide member 110 may include a resin material such as silicone or epoxy. The light guide member 110 may include a thermosetting resin material, and may optionally include, for example, PC, OPS, PMMA, PVC, etc. The light guide member 110 may be formed of glass, but is not limited thereto. For example, a main material of the light guide member 110 may use a resin material whose main ingredient is urethane acrylate oligomer.

Since the light guide member 110 is provided as a layer that guides light with resin, it may be provided with a thin thickness compared to a glass material and may be provided as a flexible plate. The light guide member 110 can emit light in a circular dot pattern or a polygonal dot pattern from the light source 102. The light guide member 110 can include a bead (not shown), and the bead can diffuse and reflect incident light, thereby increasing the amount of light. The bead can be composed of any one selected from silicon, silica, glass bubble, PMMA (Polymethyl methacrylate), urethane, Zn, Zr, Al₂O₃, and acryl.

The light source 102 may be embedded in the light guide member 110. The light source 102 is disposed in the light guide member 110 and emits the generated light toward the light guide member 110. The light guide member 110 can protect the internal light source 102 and reduce the loss of light emitted from the light source 102. The light source 102 can be disposed in a region that does not vertically overlap with the exit surface 151 of the light guide member 110.

The uppermost layer or upper surface of the substrate 101 may be in contact with the lower surface S0 of the light guide member 110. When the reflective layer disclosed above is disposed on the uppermost layer, the reflective layer may be in contact with the lower surface S0 of the light guide member 110. Here, the reflective layer may be fixed between the light guide member 110 and the substrate 101.

As shown in FIG. 3 and FIG. 6, the maximum length X1 of the light guide member 110 in the first direction X may be greater than the width Y1 in the second direction Y. In this case, the light guide member 110 is one, two or more, or four or less light emitting cells. The light emitting cell may have a maximum length in the first direction X that is greater than its width in the second direction Y. The maximum height TO of the light guide member 110 in the third direction Z may be smaller than the maximum length X1 in the first direction X and may be equal to or different from the width Y1 in the second direction Y. For example, the maximum height TO of the light guide member 110 in the third direction Z may be greater than the width Y1 (see FIG. 6) in the second direction Y, and the difference between the height TO and the width Y1 may be 5 mm or less, for example, 3 mm or less. By providing the maximum height TO of the third direction Z of the light guide member 110 to be greater than the width Y1, a vertical guide space can be provided for light emitted from the light source 102, and if it is smaller than the width Y1, light extraction efficiency may be reduced. By providing the width Y1 of the second direction Y of the light guide member 110 to be narrow and the length X1 of the first direction X to be long, a dot pattern light can be provided to a vehicle lamp having a narrow width. The light guide member 110 includes an exit surface 151 and a first reflective surface 131 on the opposite side of the exit surface 151. The first reflective surface 131 may be disposed on the other side of the light guide member 110. The light guide member 110 may include a second reflective surface 111 on one side. The second reflective surface 111 is a surface of one side of the light guide member 110 and may reflect light emitted from the light source 102 to the first reflective surface 131.

The exit surface 151 is a surface from which light emitted from the light source 102 is emitted, and may be the upper surface of the light guide member 110. The first reflective surface 131 is a surface that reflects the incident light in the direction of the exit surface 151.

The exit surface 151 may have a pattern P1 having a predetermined shape arranged in a first direction X or/and a second direction Y. The plurality of patterns P1 are arranged in a matrix shape, and each unit pattern may be connected in the first and second directions X and Y that are orthogonal to each other, and may have a convex curved shape, or, as shown in FIG. 12 and FIG. 14, a polygonal pyramid shape, or a prism pattern P2. As another example, the pattern P1 may be arranged in a diagonal direction inclined with respect to the first direction X or/and the second direction Y.

The exit surface 151 may overlap with the first reflective surface 131 in the vertical direction Z. The exit surface 151 may not overlap with the second reflective surface 111 in the vertical direction Z. The first reflective surface 131 may not overlap with the second reflective surface 111 in the vertical direction Z. The first reflective surface 131 may overlap with the second reflective surface 111 in the first direction X. Here, the substrate 101 may overlap with the second reflective surface 111 and the exit surface 151 in the vertical direction. A portion of the substrate 101 may overlap with the first reflective surface 131 in the vertical direction. A one end or starting position of the first reflective surface 131 may be positioned further outward than the upper end or end position of the second reflective surface 111, or may be positioned closer to the other end of the light guide member 110 than the top or end position of the second reflective surface 111.

An area of the exit surface 151 may be larger than an area of the first reflective surface 131. The length of the exit surface 151 in the first direction X may be larger than the length of the first reflective surface 131 in the first direction X. The width Y1 of the exit surface 151 in the second direction Y may be the same as the width of the first reflective surface 131 in the second direction Y. The width Y1 of the second direction Y of the exit surface 151 may be the same as the width of the second direction Y of the second reflective surface 111.

The first reflective surface 131 may be provided in a multi-step structure. The first position of the first reflective surface 131 adjacent to the light source 102 is the lowest, and a height of the first reflective surface 131 may gradually increase as the position of the region is further from the light source 102. That is, based on a straight line extending horizontally to the upper surface of the substrate 101, the height T1, T2, T3, T4, T5 and T6 of the first reflective surface 131 may gradually increase as the region is further from the light source 102.

The multi-step structure of the first reflective surface 131 includes an inclined surface. The inclined surface may be horizontally opposed to the second reflective surface 111. The inclined surface may reflect light reflected by the second reflective surface 111 in the direction of the exit surface. A straight line passing through the lower end of each reflective portion C1-C6 of the second reflective surface 111 may be set at an angle of 70 degrees or less, for example, 30 degrees to 70 degrees or 40 degrees to 52 degrees, based on a straight line horizontal to the upper surface of the substrate 101. As shown in FIG. 6, the first reflective surface 131 includes a plurality of reflective portions C1, C2, C3, C4, C5 and C6, and the plurality of reflective portions C1, C2, C3, C4, C5 and C6 may include n (n is 3 or more) reflective portions. The above-described plurality of reflective portions C1, C2, C3, C4, C5 and C6 may be arranged in a step structure having a gradually increasing height from one end to the other end of the first reflective surface 131. The above-described plurality of reflective portions C1, C2, C3, C4, C5 and C6 may include a first reflective portion C1 adjacent to the light source 102, a second reflective portion C2 adjacent to or disposed outside the first reflective portion C1, an outermost reflective portion C6, and one or more intermediate reflective portions C3, C4 and C5 between the outermost reflective portion C6 and the second reflective portion C2. The intermediate reflective portions C3, C4 and C5 may include, for example, third to fifth reflective portions C3, C4 and C5, and the outermost reflective portion may be a sixth reflective portion C6. For example, the first reflective portion C1 may have a first height T1 based on the upper surface of the substrate 101, and the second reflective portion C2 may have a second height T2 greater than the first height T1. In this form, the height may gradually increase from the first reflective portion C1 to the sixth reflective portion C6. Each of the plurality of reflective portions C1, C2, C3, C4, C5 and C6 may be arranged at equal intervals in the first direction, and the last reflective portion C6 may be disposed up to the last inclined surface or may include the other end. Here, the other end of the first reflective surface 131 may be connected to the pattern P1 and may extend horizontally from the inclined surface. The other end of the first reflective surface 131 has an outer first end portion 29A and an inner second end portion 29B, and the first and second end portions 29A and 29B may be arranged in a zigzag shape. The second end portion 29B is disposed further inward than the first end portion 29A, and can be disposed between protrusions 152 having concave or open region 30. Here, the region 30 between the protrusions 152 is open from the lower surface to the upper surface, and the region 30 between the first to fifth reflective portions C1-C5 can be a concave region. Each of the plurality of reflective portions C1, C2, C3, C4, C5 and C6 includes a plurality of first surfaces 31, 32, 33, 34, 35 and 36 and a plurality of second surfaces 41, 42, 43, 44, 45 and 46, and the plurality of first surfaces 31, 32, 33, 34, 35 and 36 are spaced apart from each other in the second direction Y, and the plurality of second surfaces 41, 42, 43, 44, 45 and 46 can be spaced apart from each other in the second direction Y. Each of the first surfaces 31, 32, 33, 34, 35 and 36 and the second surfaces 41, 42, 43, 44, 45 and 46 are arranged in a zigzag shape in the second direction Y and may have a constant interval. The plurality of first surfaces 31, 32, 33, 34, 35 and 36 are spaced apart by a width E1 of the second surfaces 41, 42, 43, 44, 45 and 46, and the plurality of second surfaces 41, 42, 43, 44, 45 and 46 are spaced apart by a width of the first surfaces 31, 32, 33, 34, 35 and 36. The widths of the first surfaces 31, 32, 33, 34, 35 and 36 and the widths E1 of the second surfaces 41, 42, 43, 44, 45 and 46 are lengths in the second direction and may be equal to each other. Each of the plurality of reflective portions C1-C6 may have the first surface 31, 32, 33, 34, 35 and 36 and the second surface 41, 42, 43, 44, 45 and 46 alternately arranged or may have a matrix form, and may emit light in a dot matrix shape through a matrix-shaped pattern P1 of the exit surface 151.

Based on a straight line extended on the upper surface of the substrate 101, the lower height T1, T2, T3, T4, T5 and T6 of the first surface 31, 32, 33, 34, 35 and 36 in each of the reflective portions C1-C6 may be the same as a lower height of the second surface 41, 42, 43, 44, 45 and 46. The lower heights T1, T2, T3, T4, T5 and T6 of the first surfaces 31, 32, 33, 34, 35 and 36 in different reflective portions may be different from each other. The bottom heights of the second surfaces 41, 42, 43, 44, 45 and 46 in different reflective portions may be different from each other. The height T6 of the lower surface of the sixth reflective portion C6, which is the last reflective portion, may be disposed at a position equal to or greater than 80% of the maximum thickness TO of the light guide member 110 based on a straight line horizontal to the upper surface of the substrate 101, for example, in a range of 80% to 90%. In the heights T1-T6 of each reflective portion C1-C6, the height difference between two adjacent reflective portions may be equal to the first height T1. That is, the height differences between the adjacent reflective portions may be equal to each other. The height T1 of the first reflective portion C1 adjacent to the light source 102 may be the lowest, and the height of the last reflective portion C6 may be the highest. That is, the height of the lower space of the first reflective portion C1 may be the smallest, and the height T6 of the lower surface of the sixth reflective portion C6 may be the largest.

In each of the reflective portions C1-C6, the first surface 31, 32, 33, 34, 35 and 36 may be spaced further away from the light source 102 or one end of the first reflective surface 131 than the second surface 41, 42, 43, 44, 45 and 46. In each of the reflective portions C1-C6, the first surface 31, 32, 33, 34, 35 and 36 is disposed further outward along the first direction X with respect to one end of the first reflective surface 131 than the second surface 41, 42, 43, 44, 45 and 46. The first surface 31, 32, 33, 34, 35 and 36 is positioned on the other side of the first direction X than the second surface 41, 42, 43, 44, 45 and 46 and may be disposed on one side, the other side, or both sides of the second direction Y. The second surface 41, 42, 43, 44, 45 and 46 is positioned on one side of the first direction X than the first surface 31, 32, 33, 34, 35 and 36 and may be disposed on one side, the other side, or both sides of the second direction Y.

On the first side surface S1 of the light guide member 131, the first surface 31, 32, 33, 34, 35 and 36 may be exposed, or the second surface 41, 42, 43, 44, 45 and 46 may be exposed. The second side surface S2 of the light guide member 131 may expose the second surface 41, 42, 43, 44, 45 and 46 or the first surface 31, 32, 33, 34, 35 and 36. Different first surfaces 31, 32, 33, 34, 35 and 36 and second surfaces 41, 42, 43, 44, 45 and 46 may be exposed on the first side surface S1 and the second side surface S2 of the light guide member 131. As another example, the same first surface 31, 32, 33, 34, 35 and 36 or second surface 41, 42, 43, 44, 45 and 46 may be exposed on the first side surface S1 and the second side surface S2 of the light guide member 131. The shape of the reflective surface exposed on both sides of the light guide member 131 may vary depending on the pattern shape. Accordingly, the lighting device may provide various light distribution images depending on the pattern shape. The shape of the first and second surfaces 31-36 and 41-46 may be not only a square, but also a polygonal structure larger than a triangle, a long line shape in the first direction, a long line shape in the second direction, a circular shape, or an elliptical shape. The shape of the pattern P1 may not only be a polygonal shape, but also a polygon such as a triangle or a pentagon, or a circular shape or an elliptical shape. In addition, the pattern P1 may be a long line shape in the first direction or a long line shape in the second direction.

As shown in FIG. 6, FIG. 10 and FIG. 18, in the matrix-shaped pattern P1, each pattern P1 corresponding to the first surface 31-36 and the second surface 41-46 of the reflective portion C1-C6 is defined as a light portion B1, and each pattern P1 corresponding to the region between the first surface 31-36 and the second surface 41-46 may be a dark region B2 having low luminosity or low light quantity. Accordingly, the patterns of the light portion B1 and the dark portion B2 in the exit surface 151 may be arranged alternately in the first and second directions. In FIG. 18, the region A1 is a region corresponding to the middle reflective portion among the reflective portions C1-C6.

Referring to FIGS. 4 to 6, the lower surface of the first reflective surface 131 may include a plurality of bottom surfaces 21, 22, 23, 24, 25 and 26. The plurality of bottom surfaces 21, 22, 23, 24, 25 and 26 may be a bottom surface of each reflective portion C1-C6.

The plurality of bottom surfaces 21, 22, 23, 24, 25 and 26 are connected to the lower end of the first surface 31-36 on one side, the other side, or both sides of the second direction Y of the second surface 41-46 of each reflective portion C1-C6. Each of the bottom surfaces 21, 22, 23, 24, 25 and 26 has a bottom region 20 between the upper end of the first surface 31-36 and the lower end of the second surface 41-46, and the bottom region 20 may be connected to the upper end of the first surface 31-36 and the lower end of the second surface 41-46. In addition, a portion 20A of the bottom region 20 may extend to the region between each of the bottom surfaces 21-26.

The plurality of bottom surfaces 21-26 are arranged as horizontal surfaces or non-reflective surfaces in the region between the first surface 31-36 and the second surface 41-46, and the lower surfaces of two adjacent reflective portions may extend horizontally. The region of the bottom surface 21-26 may correspond to a dark pattern on the exit surface 151. Here, the sum of the number of the first surfaces 31-36 and the number of the second surfaces 41-46 may be different from the number of the plurality of patterns P1, and may be smaller than the number of the patterns P1. The number of the patterns P1 may be at least twice or between twice and three times the sum of the number of the first surfaces 31-36 and the number of the second surfaces 41-46.

As shown in FIG. 6 and FIG. 11, in the horizontal direction, the length W1 of the first surface 31-36 and the length W2 of the second surface 41-46 are the lengths on a straight line passing through both ends of the first surface 31-36 and the second surface 41-46, and may be equal to each other.

The width E1 of the first surface 31-36 and the second surface 41-46 in the second direction may be equal to the length W1 and W2 of the first surface 31-36 and the second surface 41-46 in the horizontal direction. The length between the lower end and the upper end of each of the first surface 31-36 and the second surface 41-46 in the inclined direction may be greater than the width E1 of each of the first surface 31-36 and the second surface 41-46. Accordingly, the first surface 31-36 and the second surface 41-46 may vertically overlap each pattern P1 of the exit surface 151 and reflect incident light toward each pattern P1 of the exit surface 151.

As shown in FIG. 11, a light guiding distance of light that horizontally travels from the light source 102 through the second reflective surface 111 to the center portion of the first surface 32 of the second reflective portion C2 may be greater than a light guiding distance of light that horizontally travels from the light source 102 through the second reflective surface 111 to the center portion of the first surface 31 of the first reflective portion C1. In addition, the light guiding distance of light that vertically travels from the center of the first surface 31 of the first reflective portion C1 to the exit surface 151 may be greater than the light guiding distance of light that vertically travels from the center of the first surface 32 of the second reflective portion C2 to the exit surface 151. In this way, a thickness of the light guide member 110 may be provided thinner in regions farther from the light source 102 so as not to affect the light distribution due to the light guide distance passing through each reflective portion C1-C6.

As shown in FIG. 11, the width W3 between the lower end of the first surface 31-36 and the upper end of the second surface 41-46 may be equal to the horizontal length W1 and W2 of the first surface 31-36 and the second surface 41-46. Accordingly, the exit surface 151 can emit light in a matrix shape having an area of a constant unit dot pattern.

As shown in FIG. 6, a distance E5 between the first surface 31-36 and the second surface 41-46 of the adjacent reflective portions C1-C6 may be equal to the length W1 of the first surface 31, 32, 33, 34, 35 and 36 and/or a length W2 of the second surface 41, 42, 43, 44, 45 and 46. As shown in FIG. 11, the interval (e.g., W2) between the first surface 31-36 and the second surface 41-46 within each reflective portion C1-C6 may be equal to the length W1 of the first surface 31-36 and/or the length W2 of the second surface 41-46. In addition, the heights T11 of each reflective portion C1-C6 may be equal to each other. Accordingly, light uniformly reflected by the first reflective surface 131 can be extracted through the pattern P1 of the exit surface 151.

As shown in FIG. 5, the inclination angle R12 of the first surface 31-36 is an internal angle and may have an inclination of 120 degrees or more with respect to a straight line horizontal to the upper surface of the substrate 101. The inclination angle R12 of the first surface 31, 32, 33, 34, 35 and 36 may have, for example, a range of 120 degrees to 150 degrees or a range of 128 degrees to 140 degrees.

The inclination angle of the second surface 41, 42, 43, 44, 45 and 46 is an internal angle and may have a range of 120 degrees to 150 degrees or a range of 128 degrees to 140 degrees with respect to a straight line horizontal to the upper surface of the substrate 101. The inclination angle R12 of the first surface 31, 32, 33, 34, 35 and 36 may be the same as the inclination angle of the second surface. Accordingly, the light reflected through the first surface 31-36 and the second surface 41-46 may have a uniform light distribution through each pattern P1 of the exit surface 151. Here, FIG. 17(*a*) is a light distribution in a unit pattern of the exit surface 151 when the inclination angle R12 of the first surface 31-36 and the second surface 41-46 is 135 degrees, and FIG. 17(*b*) is a light distribution in a unit pattern of the exit surface 151 when the inclination angle of the first surface 31-36 and the second surface 41-46 is 133 degrees. The pattern P1 at this time may be a polygonal plane. FIG. 17(*c*) is a light distribution when the inclination angle of the first surface 31-36 and the second surface 41-46 is 133 degrees and the unit pattern P1 of the exit surface 151 is a convex curved surface, and a three-dimensional pattern can be emitted. In this way, the embodiment of the invention can provide a uniform light distribution in each pattern P1 by making the inclined first and second surfaces of the first reflective surface 131 and the convex patterns of the exit surface 151 correspond.

FIG. 10 is a result of measuring the light distribution reflected by the second reflective surface 111. As shown in FIG. 10, the light source 102 includes an LED chip, and the LED chip has the highest luminosity of light emitted from the center of the upper surface. Accordingly, the distribution angle R1 of the main light at the center of the upper surface of the light source 102 may have the highest light distribution (i.e., the distribution of the main light) within a range of 70 degrees or less, for example, 30 to 60 degrees. That is, the highest light distribution (i.e., the distribution of the main light) on the light source 102 may have a sum (i.e., R1) of the outer angle R10 and the inner angle R11 based on the optical axis of 70 degrees or less or within a range of 30 to 60 degrees. Here, the outer angle R10 may be equal to or greater than the inner angle R11, and the difference between the inner angle R11 and the outer angle R10 may be 5 degrees or less. In this way, since the distribution of the light emitted from the light source 102 is different depending on the area, the distribution of the light reflected by the first reflective surface 131 may also be transmitted differently.

Referring to FIGS. 4 and 10, the distance D1 between the lower end of the second reflective surface 111 and the light source 102 may be 5 mm or less, for example, in the range of 1 to 5 mm or 2 to 4 mm. When the minimum distance D2 between the light source 102 and the second reflective surface 111 is smaller than the above range, the dark region in the lower center region G1 disclosed in FIG. 20 may increase, and when it is larger than the above range, the overall brightness may decrease. FIG. 20 is a light distribution diagram on the other side of the light guide member, and it can be seen that the middle regions G3 and G4 among the outer regions of the lower center region G1 appear higher than the other regions. In order to resolve this difference in brightness, the invention can process the surfaces of the first reflective surface 131 corresponding to the middle regions G3 and G4 into an inclined surface of an uneven pattern. That is, the center between the top and bottom of the second reflective surface 111 can face a region A11 of the first and second surfaces having the uneven pattern.

The invention can have an uneven pattern for reducing light reflection in a region where the main light is transmitted among the first reflective surface 131. The uneven pattern can be provided as a rough surface through surface treatment in a chemical or molding process. As shown in FIG. 19, it can be provided as an inclined surface 33A of an inclined uneven pattern and an inclined plane 23A, and the reflected light intensity or light quantity transmitted to each bright portion pattern can be lowered by the inclined surface 33A of the inclined uneven pattern. The first surface 31-36 or the second surface 41-46 can include an inclined surface 33A of an inclined uneven pattern or an inclined plane 23A. Accordingly, the corroded inclined surface 33A may be located in the center region A11 through which the main light is transmitted, and the center region A11 of the first reflective surface 131 may be surfaces of the center region among the distributions of the first surfaces 31-36 and the second surfaces 41-46. Accordingly, the difference in intensity or distribution between the light reflected in the peripheral region of the first reflective surface 131 and the light reflected in the center area A11 may be reduced, so that the light distribution at the exit surface 151 may be uniform. The center region A11 of the first reflective surface 131 may be a center region in the second direction and the third direction among the regions of the first reflective surface 131.

The lower surface S0 of the light guide member 110 is the lowest surface and may have a region smaller than the region of the first reflective surface 131. The lower surface S0 of the light guide member 110 is provided as a horizontal plane and may be bonded to the substrate 101. The maximum length X1 of the light guide member 110 in the first direction may be smaller than the maximum length Y1 of the first reflective surface 131 in the second direction Y, and may be less than 60% of the maximum length of the first reflective surface 131 in the second direction Y. Accordingly, the region of the first reflective surface 131 of the light guide member 110 may be increased, and the region of the lower surface S0 facing the substrate 101 may be minimized. The width Y1 of the second direction Y of the lower surface S0 of the light guide member 110 may be the same as the width of the second direction Y of the first reflective surface 131.

As shown in FIGS. 3, 4, and 7, the second reflective surface 111 is one side of the light guide member 110 and includes a flat reflective portion 112 and a curved reflective portion 113. The flat reflective portion 112 is disposed on the outside of the light source 102 and may overlap with the light source 102 in a horizontal direction. The height H1 of the flat reflective portion 112 is the height from the lower end to the upper end, and may be at least twice as high as the thickness of the light source 102, and may be 30% or less of the maximum height TO of the light guide member 110, for example, in the range of 15% to 30% or in the range of 15% to 25%.

A straight line passing through the upper end of the flat reflective portion 112 and the center of the upper surface of the light source 102 has a third angle R3 with respect to the center axis of the light source 102, and the third angle R3 may be at least 60 degrees, for example, in the range of 60 degrees to 80 degrees or in the range of 65 degrees to 80 degrees. When the upper position of the flat reflective portion 112 is provided within the above-mentioned range, light emitted through the outer surface of the light source 102 may be reflected by the flat reflective portion 112. The flat reflective portion 112 may have higher reflection efficiency than a convex curved surface, and may be provided as a plane perpendicular to the outside of the light source 102, thereby reducing the size of a dark portion caused by light emitted to the outside of the light source 102. In addition, the region of the flat reflective portion 112 may reflect light having a beam angle distribution of the light source 102, that is, light having a beam angle of 60 degrees or more or 65 degrees or more based on the optical axis.

The curved reflective portion 113 may be disposed around the flat reflective portion 112, and may be provided as a convex curved surface between the upper end of the flat reflective portion 112 and one end of the exit surface 151, and between the edge of the flat reflective portion 112 and the two side surfaces S1 and S2 of the light guide member 110. The curved reflective portion 113 has a more convex surface than a straight line passing through an edge of the flat reflective portion 112 and one end of the exit surface 151, and may have a more convex surface than a straight line passing through an edge of the flat reflective portion 112 and the side surface S1 and S2 of the light guide member 110. Accordingly, the reflection efficiency of the curved reflective portion 113 may be improved.

The curved reflective portion 113 may include a second angle R2 on the inner side and a third angle R3 on the outer side with respect to the optical axis, and the sum of the second and third angles R2 and R3 may be 70 degrees or more, for example, in a range of 70 degrees to 110 degrees or in a range of 80 degrees to 100 degrees. The curved reflective portion 113 can reflect light emitted from the light source 102 to the first reflective surface 131.

The curved reflective portion 113 can overlap with the first reflective surface 131 in the first direction X. The curved reflective portion 113 can overlap with the first surface 31-36 and the second surface 41-46 of each reflective portion C1-C6 in the first direction X. The second reflective surface 111 may not overlap with the first reflective surface 131 in the vertical direction. A portion of the flat reflective portion 112 may overlap with the first reflective portion C1 in the first direction X. That is, the height H1 of the flat reflective portion 112 may be greater than the height (e.g., T1) of a step portion 21A between the first reflective surface 131 and the lower surface S0, and may be lower than the lower height T2 of the second reflective portion C2. Accordingly, the decrease in the amount of light incident on the first reflective portion C1 may be minimized.

The curved reflective portion 113 may be disposed further outside the exit surface 151. The exit surface 151 may vertically overlap the lower surface S0 of the light guide member 110 and the first reflective surface 131.

The distance D2 from the light source 102 to the step portion 21A is the distance between the light source 102 and one end of the first reflective portion C1, and may be 5 mm or more, for example, in the range of 5 to 20 mm or 10 to 20 mm. By providing the distance D2 from the light source 102 to the first reflective portion C1 within the above range, the problem of increased brightness of the light reflected by the first reflective portion C1 can be reduced.

The exit surface 151 is arranged in a matrix form with unit patterns having convex curves, and the light reflected by the first surfaces 31-36 and the second surfaces 41-46 of the reflective portions C1-C6 is emitted in the form of a dot matrix. For example, as shown in FIG. 12, a dark portion B2 that is lower in brightness or is not emitted than a light portion B1 where light is emitted is extracted in the form of a dot matrix. Here, the region that does not overlap with the first reflective surface 131, that is, one side region of the exit surface 151 that vertically overlaps with the lower surface S0 of the light guide member 110, can be illuminated as a light region B1 without the dark portion. This one side region of the exit surface 151 can be blocked by an external lamp structure.

FIGS. 12 to 14 are other examples of the lighting device disclosed above, and will be described focusing on a configuration different from the lighting device disclosed above.

Referring to FIGS. 12 to 14, the light guide member 110 includes an exit surface 151, a first reflective surface 131, and a second reflective surface 111. The description of the embodiment disclosed above can be applied to the first reflective surface 131. The second reflective surface 111 of the light guide member 110 includes an upper curved reflective portion 113 and a lower reflective portion 112A. The lower reflective portion 112A may have a plurality of sub-reflective surfaces 11-16, and the first sub-reflective surfaces 11, 13 and 15 having a curved or inclined surface at the lower end adjacent to the light source 102 and vertical second sub-reflective surfaces 12, 14 and 16 may be alternately arranged. The lower reflective portion 112A of the second reflective surface 111 may have the sub-reflective surfaces 11-16 arranged in multiple stages to reduce light loss from the outside of the light source 102. In addition, the lower reflective portion 112A closest to the light source 102 may be provided as a third sub-reflective surface 11A of a vertical plane.

The first sub-reflective surface 11, 13 and 15 having the curved or inclined surface and the second sub-reflective surface 12, 14 and 16 have a concentric shape at the center portion of the outer lower end of the second reflective surface 111 and may have a semicircular shape. The upper height of the lower reflective portion 112A may be less than 50% of the maximum thickness TO (see FIG. 3) of the light guide member 110 based on the upper surface of the substrate 101. The upper height of the lower reflective portion 112A may be equal to or lower than the lower height of the third reflective portion C3. Here, among the first sub-reflective surfaces 11, 13 and 15, a portion of 1-2 and 1-3 sub-reflective surfaces 11, 13 and 15 and 2-1, 2-2 and 2-3 sub-reflective surfaces 12, 14 and 16 may overlap with the first to second reflective portions C1 and C2 in the horizontal direction. In this way, the lower reflective portion 112A may reflect the light traveling laterally from the light source 102 to the first reflective surface 131 as much as possible, thereby reducing light loss and providing a uniform light distribution over the entire region. Accordingly, the lower reflective portion 112A can reduce the amount of light loss at the lower portion of the second reflective surface 111 and prevent an increase in the size of the dark portion due to this.

The pattern P2 of the exit surface 151 is a prism pattern, and for example, unit patterns in the shape of polygonal cones may be arranged in a matrix form. The period or interval of the pattern P2 of the exit surface P2 may be equal to or smaller than the length of the first direction of the first surface 31-36 or the second surface 41-46. Accordingly, the emitted light may be uniformly distributed through the center and the polygonal surface of the pattern P2 by the triangular pyramid-shaped pattern.

A lighting device such as FIG. 1 and FIG. 12 may be defined as one light emitting cell. In addition, a lighting device 200A having a plurality of light emitting cells may be provided, as in FIG. 15.

Referring to FIG. 15, the lighting device 200A may include a light emitting portion 100B having a substrate 101 and a plurality of light sources 102 arranged in a second direction on the substrate 101, and a light guide member 110A that guides, reflects, and emits light emitted from the light emitting portion 100B. The light guide member 110A may include the exit surface 151B disclosed above and the first reflective surface (131, FIG. 6) opposite the exit surface 151B. The light guide member 110A may include a plurality of second reflective surfaces 111B that overlap the substrate 101 in a vertical direction on one side.

The lighting device 200A may be formed by a plurality of light emitting cells as one body. That is, the distance between the two side surfaces S11 and S12 of the light guide member 110A may be obtained by multiplying (e.g., distance*number of cells) the distance between the two side surfaces in FIG. 1 or FIG. 12 by the number of cells (* indicates multiplication). The maximum length of the light guide member 110A in the first direction may be equal to or less than twice the length X1 of FIG. 1 or FIG. 12.

Here, each of the plurality of second reflective surfaces 111B may be identical to the second reflective surface 111 of FIG. 1 or FIG. 12. The first reflective surface 131 may be identical to the first reflective surface 131 of FIG. 1 or FIG. 12. The exit surface may be arranged such that the exit surfaces 151 of FIG. 1 or FIG. 12 are arranged in a second direction. The unit width Y1 of the second reflective surface 111 in the second direction Y may be the width of the second reflective surface 111 of FIG. 1 or FIG. 12. A concave groove R0 may be formed in a region between the unit sizes of the second reflective surfaces 111 to provide the curved reflective portion 113 disclosed above. As another example, although the light-emitting cells, which are lighting devices such as FIG. 1 or FIG. 12, have been described as being integrally formed in the second direction, the light emitting cells may be arranged in a zigzag shape, and adjacent light emitting cells may be partially connected to have an angle of 10 to 90 degrees, so that the light emitting cells may be arranged in a triangle or square shape. As shown in FIG. 23, the lighting device 200 and 200A disclosed above may have the pattern P1 disclosed above exposed or visible to the rear lamp of the vehicle, and may emit light in a dot matrix shape.

As shown in FIG. 16, a reflective member 115 may be disposed on the outside of the flat reflective portion 112 of the second reflective surface 111 of the light guide member 110. The reflective portion member 115 may have a reflective material, such as a metal oxide, added to the resin material. The metal oxide may include at least one of $TiO_2$, $SiO_2$, and $Al_2O_3$. The above reflective portion member 115 reflects the light leaked to the outside of the light source 102, thereby reducing light loss, and also reducing dark portions caused by light leaked through the flat reflective portion 112.

FIG. 21 is a plan view of a vehicle to which a lighting device according to an embodiment is applied, and FIG. 22 is a drawing showing an example of a tail light of the vehicle of FIG. 21.

Referring to FIGS. 21 and 22, a front lamp 850 of a moving body or vehicle 900 may include one or more lighting modules, and the driving timing of these lighting modules may be individually controlled to provide not only the function of a conventional headlight, but also additional functions such as a welcome light or a celebration effect when a driver opens a vehicle door. The lamp may be applied to daytime running lights, high beams, low beams, fog lights, or turn signals.

In the vehicle 900, the tail lamp 800 may be arranged as a plurality of lamp units 810, 812, 814 and 816 supported by a housing. For example, the lamp units 810, 812, 814 and 816 may include a first lamp unit 810 arranged on the outside, a second lamp unit 814 arranged on the inner periphery of the first lamp unit 810, and third and fourth lamp units 814 and 816 arranged on the inside of the second lamp unit 814, respectively. The first to fourth lamp units 810, 812, 814 and 816 may selectively apply the lighting device disclosed in the embodiment, and a red lens cover or a white lens cover may be arranged on the outside of the lighting device for the lighting characteristics of the lamp units 810, 812, 814 and 816. The lighting device disclosed in the embodiment applied to the above lamp units 810, 812, 814 and 816 can emit surface light with a uniform distribution.

The first and second lamp units 810 and 812 may be provided with at least one of a curved shape, a straight shape, an angular shape, an inclined shape, or a flat shape, or a mixed structure thereof. The first and second lamp units 810 and 812 may be arranged one or more in each tail lamp. The first lamp unit 810 may be provided as a tail lamp, the second lamp unit 812 may be provided as a brake lamp, the third lamp unit 814 may be provided as a reverse lamp, and the fourth lamp unit 816 may be provided as a turn signal lamp. Such lighting lamps can provide higher brightness in the rearward direction than in the lateral direction, thereby complying with lighting regulations for stop lamps or tail lamps, etc. As shown in FIG. 23, the lighting device can emit light in a dot matrix form in the tail lamp.

Features, structures, effects, etc. described in the embodiments are included in at least one embodiment of the invention, and are not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the invention.

In addition, although the embodiments have been mainly described above, this is only an example and does not limit the present invention, and one of ordinary skill in the field to which the present invention belongs will appreciate that various modifications and applications not illustrated above may be possible without departing from the essential characteristics of the present embodiment. For example, each component specifically shown in the embodiment can be implemented by modification. And differences related to such modifications and applications should be construed as being included in the scope of the invention defined in the appended claims.

The invention claimed is:
1. A lighting device comprising:
   a substrate;
   a light source disposed on the substrate; and
   a light guide member disposed on the substrate and the light source,
   wherein the light guide member comprises an exit surface, a first reflective surface disposed on an opposite side of the exit surface, and a second reflective surface disposed one side,
   wherein the first reflective surface comprises a plurality of reflective portions having different heights with respect to a straight line extending horizontally to an upper surface of the substrate,
   wherein the substrate is disposed on a lower surface of the light guide member,
   wherein the exit surface has a first region that overlaps with the lower surface of the light guide member in a vertical direction, and a second region that overlaps with the first reflection surface in the vertical direction,
   wherein the vertical direction is a direction from the lower surface of the light guide member toward the exit surface, wherein the substrate overlaps with the second reflective surface and the first region of the light guide member in the vertical direction, wherein the exit surface has a plurality of patterns arranged in each of the first region and the second region of the exit surface, wherein each of the plurality of reflective portions comprises a bottom surface, a plurality of first surfaces inclined with respect to the bottom surface, and a plurality of second surfaces inclined from the bottom surface, and wherein each of the plurality of reflective portions comprises a concave region from the bottom surface.

2. The lighting device of claim 1, wherein the light source is positioned closer to the second reflective surface than to a position of the first reflective surface, and wherein an upper surface of the light source is positioned higher than the lower surface of the light guide member.

3. The lighting device of claim 1, wherein the plurality of patterns is arranged in first and second direction orthogonal to each other in the first region of the exit surface.

4. The lighting device of claim 3, wherein the plurality of patterns is arranged in first and second direction orthogonal to each other in the second region of the exit surface.

5. The lighting device of claim 1, wherein the plurality of first surfaces and the patterns of the second region of the exit surface overlap in the vertical direction.

6. The lighting device of claim 5, wherein the plurality of second surfaces and the patterns of the second region of the exit surface overlap in the vertical direction.

7. The lighting device of claim 1, wherein the plurality of second surfaces is disposed closer to the light source than the first surface.

8. The lighting device of claim 1, wherein the light guide member has a maximum length in a first direction greater than a width in a second direction orthogonal to the first direction, and wherein the plurality of first surfaces of each of the plurality of reflective portions is spaced apart from each other in the second direction.

9. The lighting device of claim 1, wherein the plurality of second surfaces of each of the plurality of reflective portions overlaps in the second direction, and wherein the plurality of first surfaces and the plurality of second surfaces each of the plurality of reflective portions do not overlap in the second direction.

10. The lighting device of claim 1, wherein the light guide member has a maximum length in a first direction greater than a width in a second direction orthogonal to the first direction, and wherein the first reflective surface and the second reflective surface overlap in the first direction.

11. A lighting device comprising:

a light guide member, a substrate disposed facing a lower surface of the light guide member; and a light source disposed on the substrate and protruding into an inner portion of the light guide member, wherein the light guide member comprises an exit surface, a first reflective surface disposed on an opposite side of the exit surface, and a second reflective surface disposed on an outer side of the exit surface and a lower surface of the light guide member, and wherein the first reflective surface comprises a plurality of bottom surfaces, a plurality of protrusions having a plurality of first surfaces inclined from each of the plurality of bottom surfaces, a concave region between the plurality of protrusions, and a second surface inclined on the concave region.

12. The lighting device of claim 11, wherein the plurality of bottom surface has different heights with respect to a straight line extending horizontally to the lower surface of the light guide member.

13. The lighting device of claim 11, wherein the concave region of each of the plurality of bottom surfaces have different depths from a straight line extending from the lower surface of the light guide member.

14. The lighting device of claim 11, wherein the exit surface has a first region that overlaps with the lower surface of the light guide member in a vertical direction, and a second region that overlaps with the first reflection surface in the vertical direction, and wherein the vertical direction is a direction from the lower surface of the light guide member toward the exit surface.

15. The lighting device of claim 14, wherein the substrate overlaps with the exit surface and the first region in the vertical direction, and wherein the exit surface has a plurality of patterns arranged in each of the first region and the second region of the exit surface.

16. The lighting device of claim 15, wherein the plurality of patterns is arranged in first and second direction orthogonal to each other in the first region of the exit surface, and wherein a thickness of the light guide member gradually becomes thinner as the first surface becomes farther from the light source.

17. The lighting device of claim 15, wherein the plurality of patterns is arranged in first and second direction orthogonal to each other in the second region of the exit surface, and wherein the light guide member has a maximum length in the first direction greater than a width in the second direction.

18. The lighting device of claim 15, wherein the plurality of first surfaces and the patterns of the second region of the exit surface overlap in the vertical direction, and wherein the plurality of second surfaces and the patterns of the second region of the exit surface overlap in the vertical direction.

19. The lighting device of claim 11, wherein the second reflective surface includes a flat reflective portion and a curved reflective portion, wherein the flat reflective portion has a plane perpendicular to an outside of the light source, has a height more than twice a thickness of the light source, and, wherein the curved reflective portion is disposed between an edge of the flat reflective portion and one end of the exit surface.

* * * * *